United States Patent
Shimo

[11] Patent Number: 5,973,854
[45] Date of Patent: Oct. 26, 1999

[54] ZOOM LENS SYSTEM

[75] Inventor: Mituaki Shimo, Osaka, Japan

[73] Assignee: Minolta Co., Ltd., Osaka, Japan

[21] Appl. No.: 08/977,730

[22] Filed: Nov. 25, 1997

[30] Foreign Application Priority Data

Nov. 28, 1996 [JP] Japan .................................. 8-318139

[51] Int. Cl.$^6$ .............................................. G02B 15/14
[52] U.S. Cl. ..................................... 359/676; 359/683
[58] Field of Search ................................... 359/676, 683, 359/708, 713–714

[56] References Cited

U.S. PATENT DOCUMENTS

| | | | |
|---|---|---|---|
| 5,050,972 | 9/1991 | Mukaiya et al. | 359/683 |
| 5,414,562 | 5/1995 | Ueda | 359/683 |
| 5,537,255 | 7/1996 | Tochigi | 359/683 |
| 5,548,445 | 8/1996 | Yahagi | 359/683 |
| 5,583,701 | 12/1996 | Yamanashi | 359/683 |
| 5,610,766 | 3/1997 | Aoki et al. | 359/683 |

FOREIGN PATENT DOCUMENTS

| | | |
|---|---|---|
| 63-205629 | 8/1988 | Japan . |
| 2-208619 | 8/1990 | Japan . |
| 4-146407 | 5/1992 | Japan . |

*Primary Examiner*—Scott J. Sugarman
*Assistant Examiner*—Jordan M. Schwartz
*Attorney, Agent, or Firm*—Sidley & Austin

[57] ABSTRACT

A zoom lens system has first to fifth lens units from the object side. The second lens unit has a negative optical power. The other lens units have each a positive optical power. During zooming, the first, third and fourth lens units move along the optical axis to vary the distances between the lens units. The zoom lens system fulfills the conditions $0.01 \leq |f2/fT| \leq 0.20$ and $25 \leq (fT/f34W) \times Z \leq 300$, where f2 represents the focal length of the second lens unit, fT represents the focal length of the entire zoom lens system at the longest focal length condition, f34W represents the composite focal length of the third and fourth lens units at the shortest focal length condition, and Z represents the zoom ratio.

16 Claims, 14 Drawing Sheets

FNO=4.10
(W)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=5.50
(M)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

FNO=5.80
(T)
— d
---- SC
-0.5  0.5
SPHERICAL SINE
ABERRATION CONDITION

Y'=17.3
---- DM
— DS
-0.5  0.5
ASTIGMATISM

Y'=17.3
-5.0  5.0
DISTORTION %

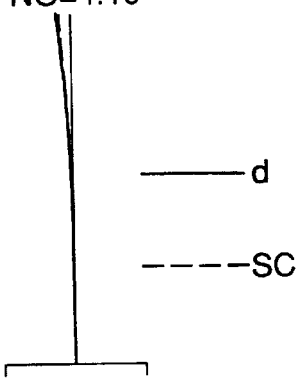
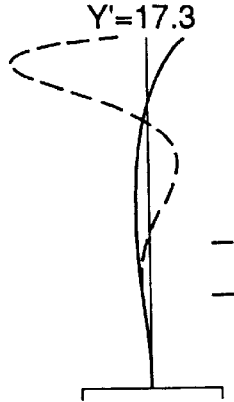
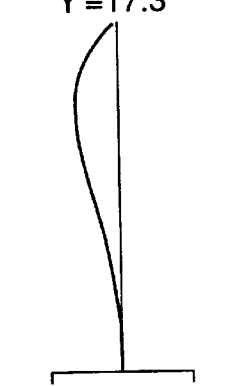
FIG. 9A
FNO=4.10
(W)
—— d
---- SC
-0.5   0.5
SPHERICAL  SINE
ABERRATION  CONDITION
FIG. 9B
Y'=17.3
---- DM
—— DS
-0.5   0.5
ASTIGMATISM
FIG. 9C
Y'=17.3
-5.0   5.0
DISTORTION %
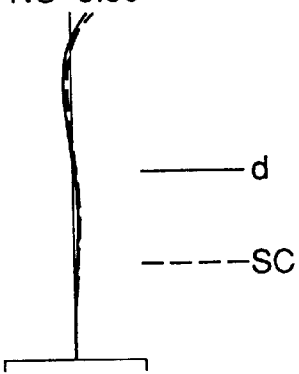
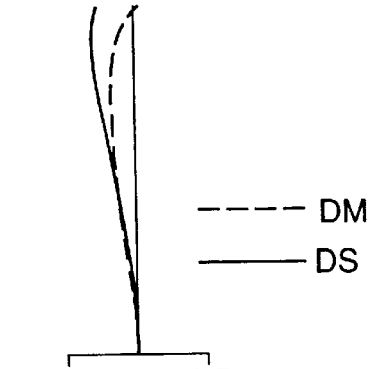
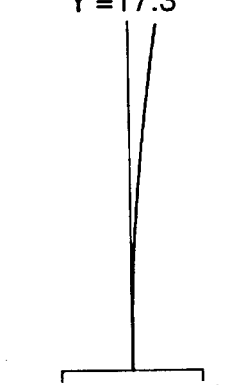
FIG. 9D
FNO=5.50
(M)
—— d
---- SC
-0.5   0.5
SPHERICAL  SINE
ABERRATION  CONDITION
FIG. 9E
Y'=17.3
---- DM
—— DS
-0.5   0.5
ASTIGMATISM
FIG. 9F
Y'=17.3
-5.0   5.0
DISTORTION %
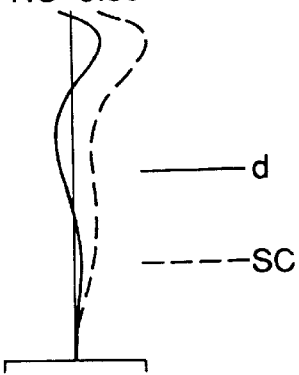
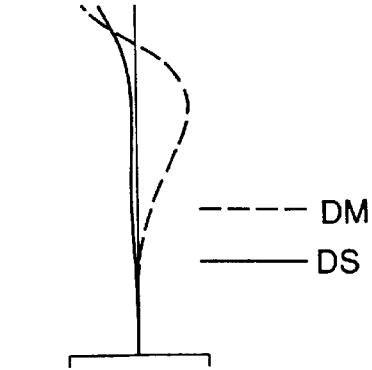
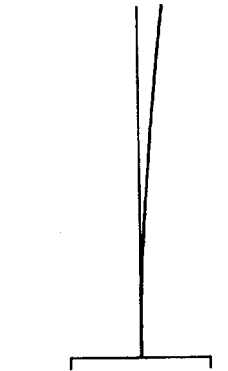
FIG. 9G
FNO=5.80
(T)
—— d
---- SC
-0.5   0.5
SPHERICAL  SINE
ABERRATION  CONDITION
FIG. 9H
Y'=17.3
---- DM
—— DS
-0.5   0.5
ASTIGMATISM
FIG. 9I
Y'=17.3
-5.0   5.0
DISTORTION %

FNO=4.10
(W)
— d
----- SC
-0.5  0.5
SPHERICAL SINE
ABERRATION CONDITION

Y'=17.3
----- DM
— DS
-0.5  0.5
ASTIGMATISM

Y'=17.3
-5.0  5.0
DISTORTION %

FNO=5.50
(M)
— d
----- SC
-0.5  0.5
SPHERICAL SINE
ABERRATION CONDITION

Y'=17.3
----- DM
— DS
-0.5  0.5
ASTIGMATISM

Y'=17.3
-5.0  5.0
DISTORTION %

FNO=5.80
(T)
— d
----- SC
-0.5  0.5
SPHERICAL SINE
ABERRATION CONDITION

Y'=17.3
----- DM
— DS
-0.5  0.5
ASTIGMATISM

Y'=17.3
-5.0  5.0
DISTORTION %

FNO=4.10

(W)

-0.5　0.5
SPHERICAL　SINE
ABERRATION　CONDITION

— d
----- SC

Y'=17.3

-0.5　0.5
ASTIGMATISM

----- DM
— DS

Y'=17.3

-5.0　5.0
DISTORTION %

FNO=5.50

(M)

-0.5　0.5
SPHERICAL　SINE
ABERRATION　CONDITION

— d
----- SC

Y'=17.3

-0.5　0.5
ASTIGMATISM

----- DM
— DS

Y'=17.3

-5.0　5.0
DISTORTION %

FNO=5.80

(T)

-0.5　0.5
SPHERICAL　SINE
ABERRATION　CONDITION

— d
----- SC

Y'=17.3

-0.5　0.5
ASTIGMATISM

----- DM
— DS

Y'=17.3

-5.0　5.0
DISTORTION %

FNO=4.10
(W)
— d
---- SC

SPHERICAL ABERRATION  SINE CONDITION
-0.5   0.5

Y'=17.3
---- DM
— DS

ASTIGMATISM
-0.5   0.5

Y'=17.3

DISTORTION %
-5.0   5.0

FNO=5.50
(M)
— d
---- SC

SPHERICAL ABERRATION  SINE CONDITION
-0.5   0.5

Y'=17.3
---- DM
— DS

ASTIGMATISM
-0.5   0.5

Y'=17.3

DISTORTION %
-5.0   5.0

FNO=5.80
(T)
— d
---- SC

SPHERICAL ABERRATION  SINE CONDITION
-0.5   0.5

Y'=17.3
---- DM
— DS

ASTIGMATISM
-0.5   0.5

Y'=17.3

DISTORTION %
-5.0   5.0

FNO=4.10
(W)
-0.5  0.5
SPHERICAL SINE
ABERRATION CONDITION
— d
---- SC

Y'=17.3
-0.5  0.5
ASTIGMATISM
---- DM
— DS

Y'=17.3
-5.0  5.0
DISTORTION %

FNO=5.50
(M)
-0.5  0.5
SPHERICAL SINE
ABERRATION CONDITION
— d
---- SC

Y'=17.3
-0.5  0.5
ASTIGMATISM
---- DM
— DS

Y'=17.3
-5.0  5.0
DISTORTION %

FNO=5.80
(T)
-0.5  0.5
SPHERICAL SINE
ABERRATION CONDITION
— d
---- SC

Y'=17.3
-0.5  0.5
ASTIGMATISM
---- DM
— DS

Y'=17.3
-5.0  5.0
DISTORTION %

FNO=4.10

(W)
—— d
----- SC

-0.5   0.5
SPHERICAL  SINE
ABERRATION CONDITION

Y'=17.3

----- DM
—— DS

-0.5   0.5
ASTIGMATISM

Y'=17.3

-5.0   5.0
DISTORTION %

FNO=5.50

(M)
—— d
----- SC

-0.5   0.5
SPHERICAL  SINE
ABERRATION CONDITION

Y'=17.3

----- DM
—— DS

-0.5   0.5
ASTIGMATISM

Y'=17.3

-5.0   5.0
DISTORTION %

FNO=5.80

(T)
—— d
----- SC

-0.5   0.5
SPHERICAL  SINE
ABERRATION CONDITION

Y'=17.3

----- DM
—— DS

-0.5   0.5
ASTIGMATISM

Y'=17.3

-5.0   5.0
DISTORTION %

ZOOM LENS SYSTEM

BACKGROUND OF THE INVENTION

1. Field of the Invention

The present invention relates to a zoom lens system, and more particularly, to a high-zoom-ratio and small-size zoom lens system suitable for use as a taking lens.

2. Description of the Prior Art

Previously disclosed high-zoom-ratio zoom lens systems having a zoom ratio of as high as 10× include one having positive, negative, positive, negative, positive configuration (Japanese Laid-open Patent Application No. S63-205629, etc.), one having positive, negative, positive, negative, positive, negative configuration (Japanese Laid-open Patent Application No. H4-146407, etc.) and one having positive, negative, negative, positive, positive configuration (Japanese Laid-open Patent Application No. H2-208619, etc.).

However, the above-mentioned zoom lens systems, which are large in total length at the shortest focal length condition, cannot be said to be handy for use as standard zoom lens systems.

SUMMARY OF THE INVENTION

An object of the present invention is to provide a high-performance and high-zoom-ratio zoom lens system that is small in total length.

To achieve the above-mentioned object, a zoom lens system according to a first aspect of the present invention comprises from the object side a first lens unit having a positive optical power, a second lens unit having a negative optical power, a third lens unit having a positive optical power, a fourth lens unit having a positive optical power and a fifth lens unit having a positive optical power, wherein zooming is performed by moving at least the first, third and fourth lens units toward the object side to vary each of the lens unit-to-lens unit distances and the following conditions are fulfilled:

$$0.01 \leq |f2/fT| \leq 0.20$$

$$25 \leq (fT/f34W) \times Z \leq 300$$

where f2 represents the focal length of the second lens unit;

fT represents the focal length of the entire zoom lens system at the longest focal length condition;

f34W represents the composite focal length of the third and fourth lens units at the shortest focal length condition; and Z represents the zoom ratio.

A zoom lens system according to a second aspect of the present invention comprises the construction according to the first aspect of the present invention, wherein the following condition is further fulfilled:

$$0.01 < |f12W/fT| < 0.15$$

where f12W represents the composite focal length of the first and second lens units at the shortest focal length condition.

BRIEF DESCRIPTION OF THE DRAWINGS

This and other objects and features of this invention will become clear from the following description, taken in conjunction with the preferred embodiments with reference to the accompanied drawings in which:

FIGS. 9A to 9I are graphic representations of aberrations in the second embodiment;

DESCRIPTION OF THE PREFERRED EMBODIMENTS

Figure 1:
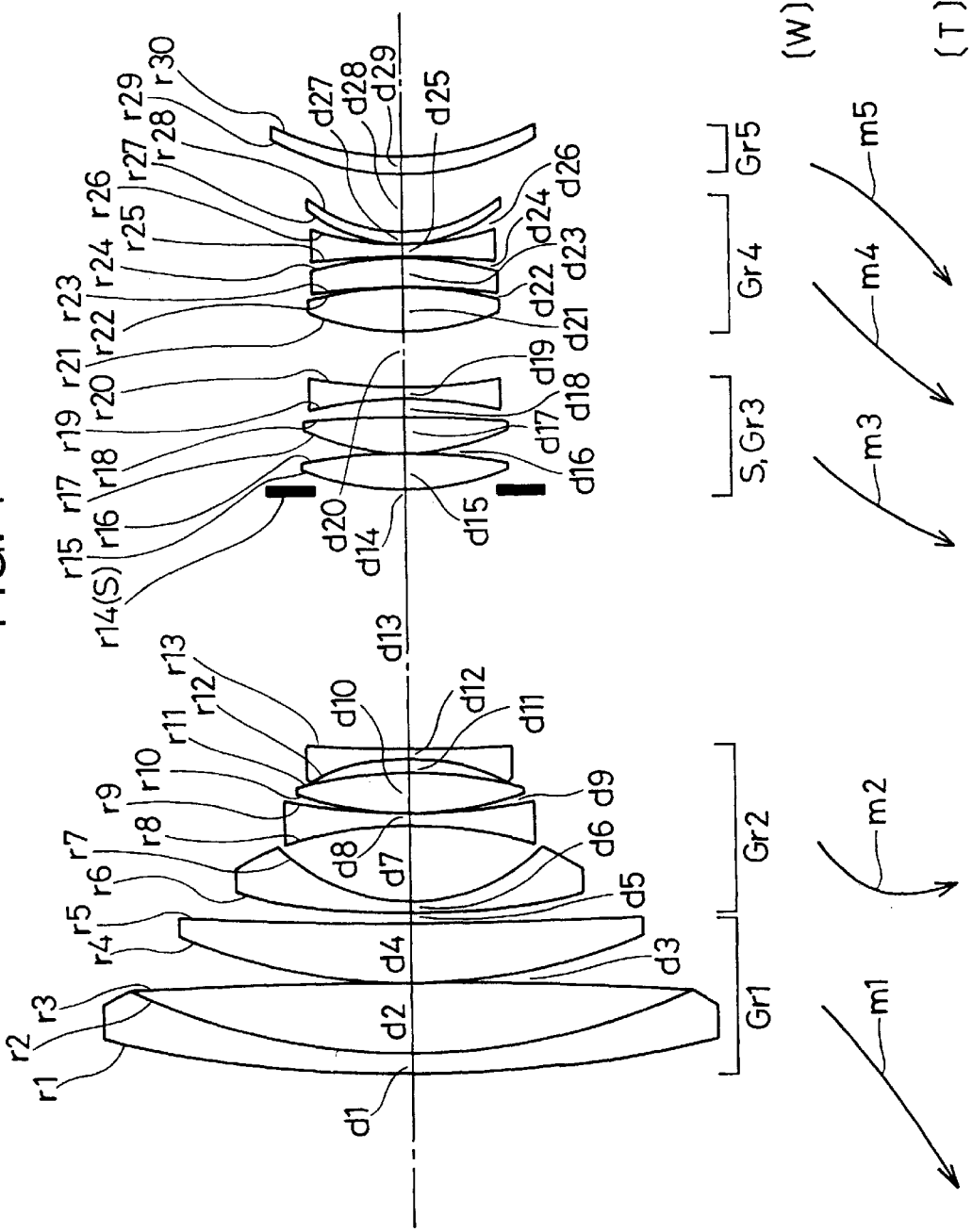
FIG. 1 shows the lens construction of a first embodiment.
Figure 2:
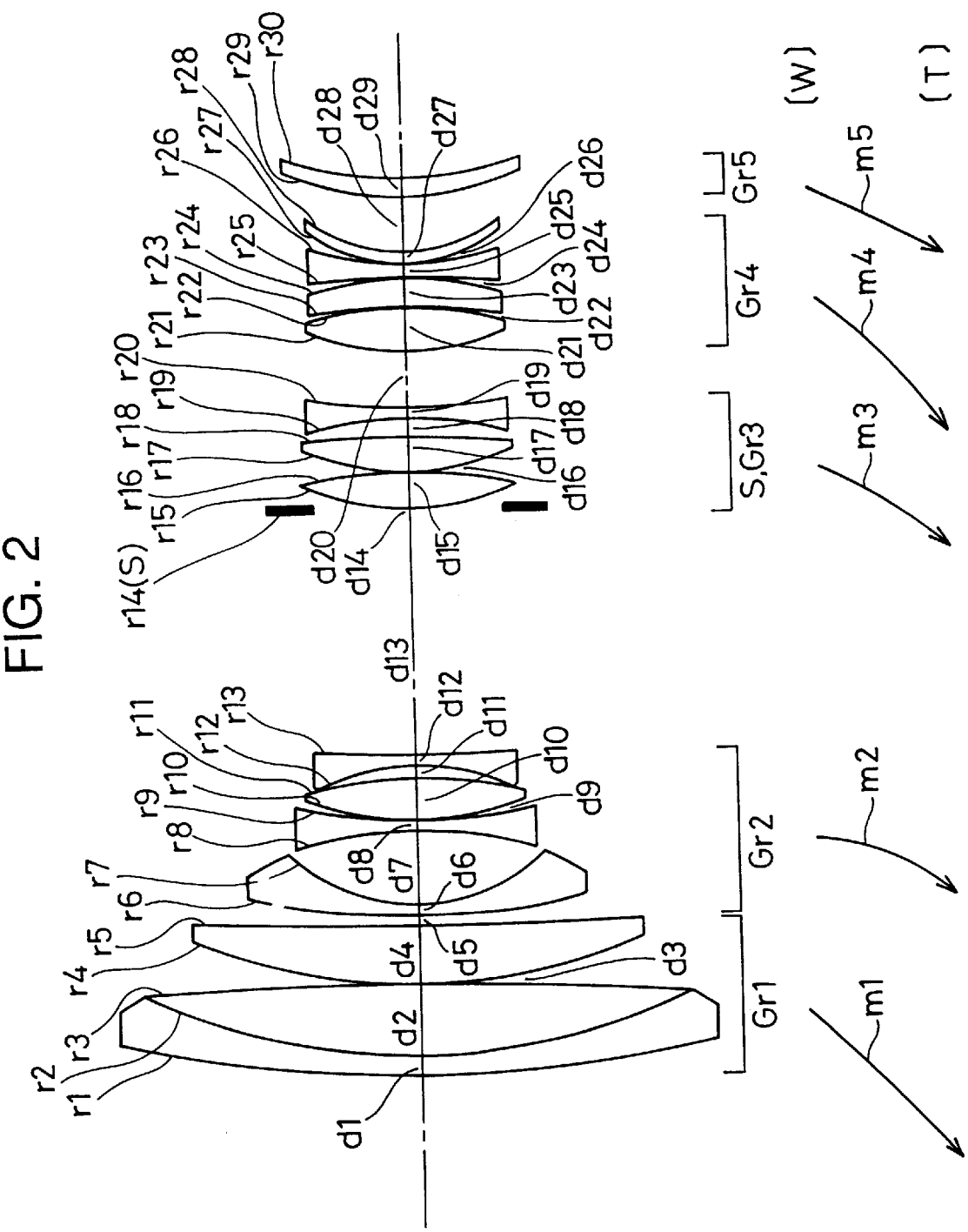
FIG. 2 shows the lens construction of a second embodiment.
Figure 3:
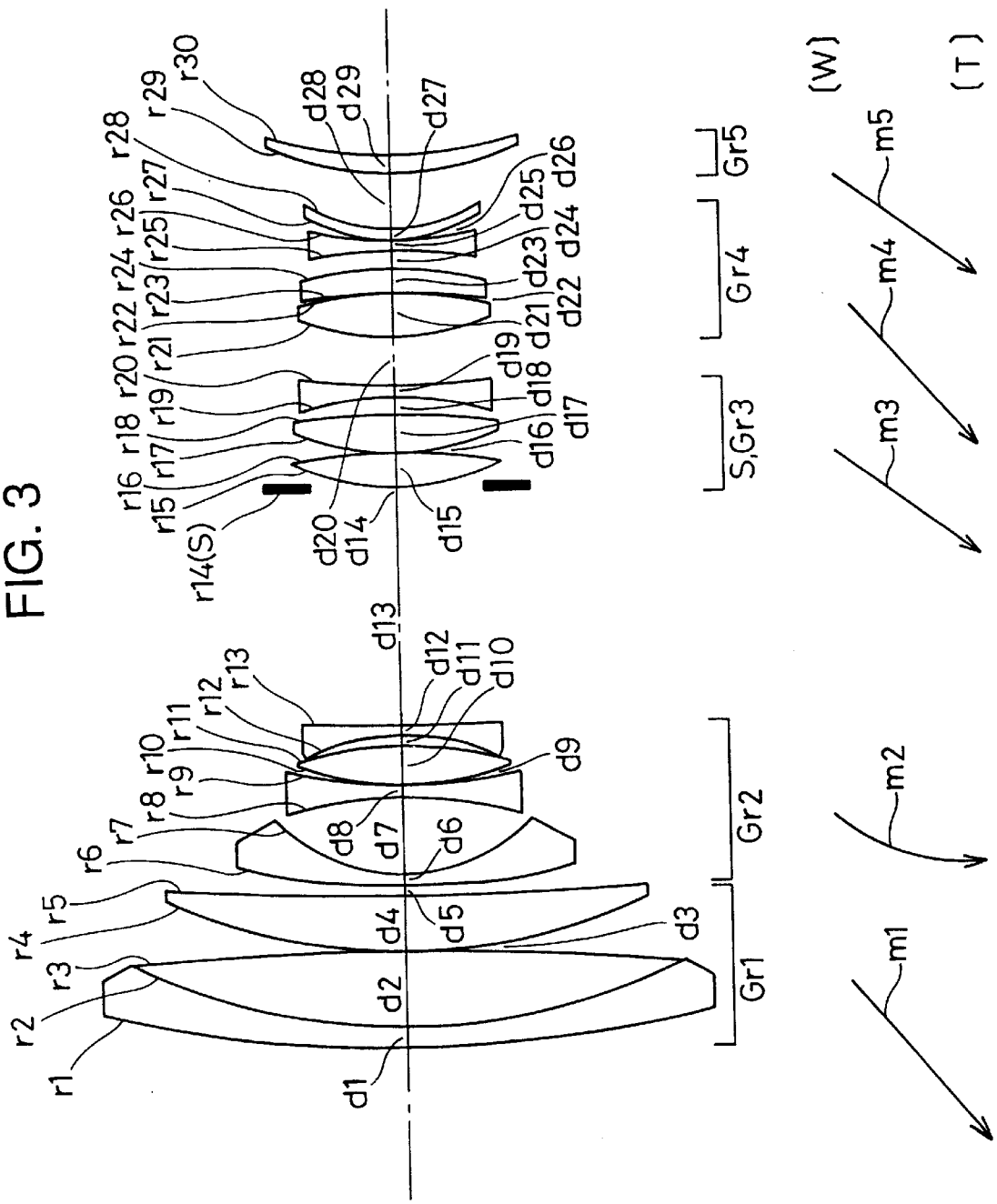
FIG. 3 shows the lens construction of a third embodiment.
Figure 4:
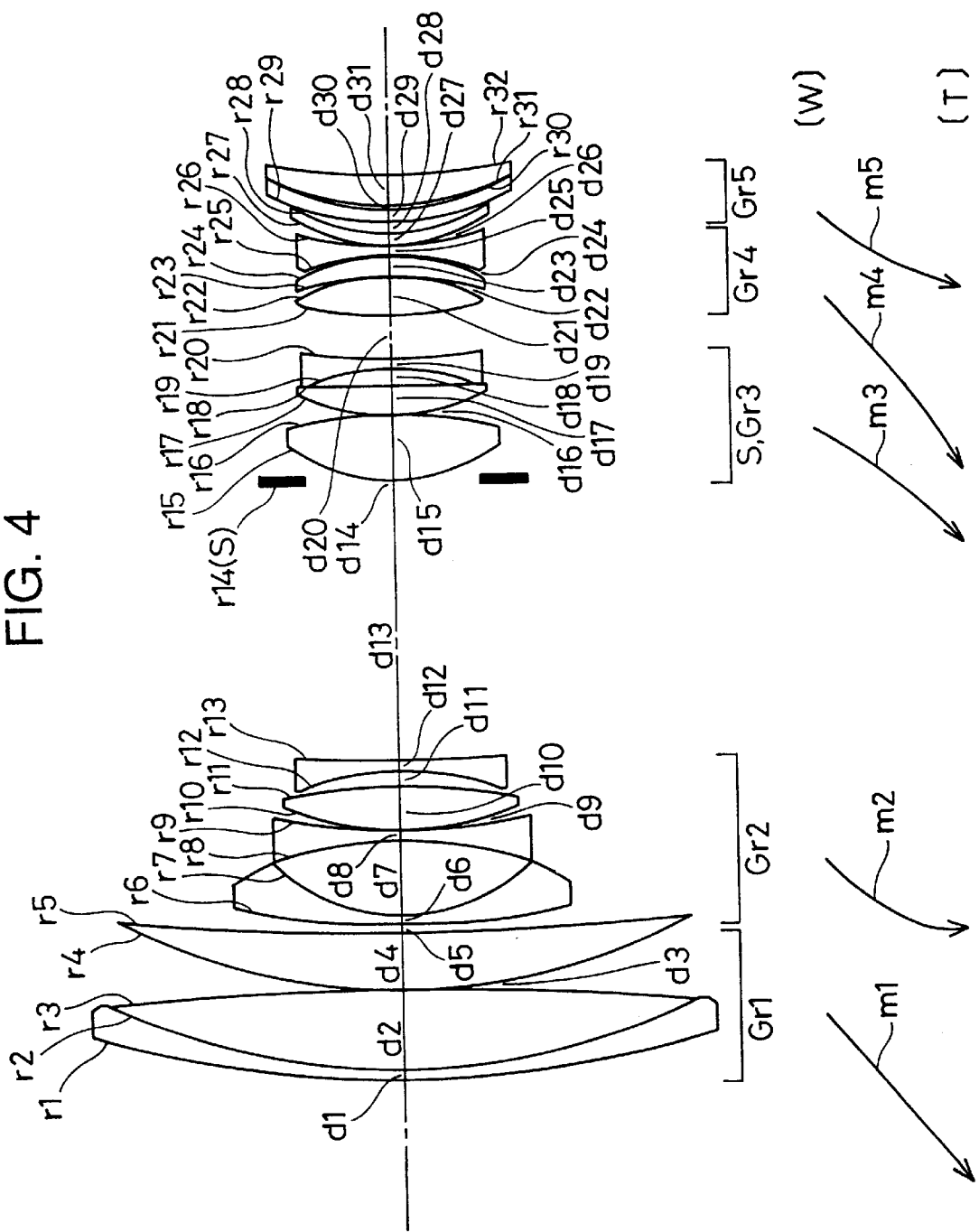
FIG. 4 shows the lens construction of a fourth embodiment.
Figure 5:
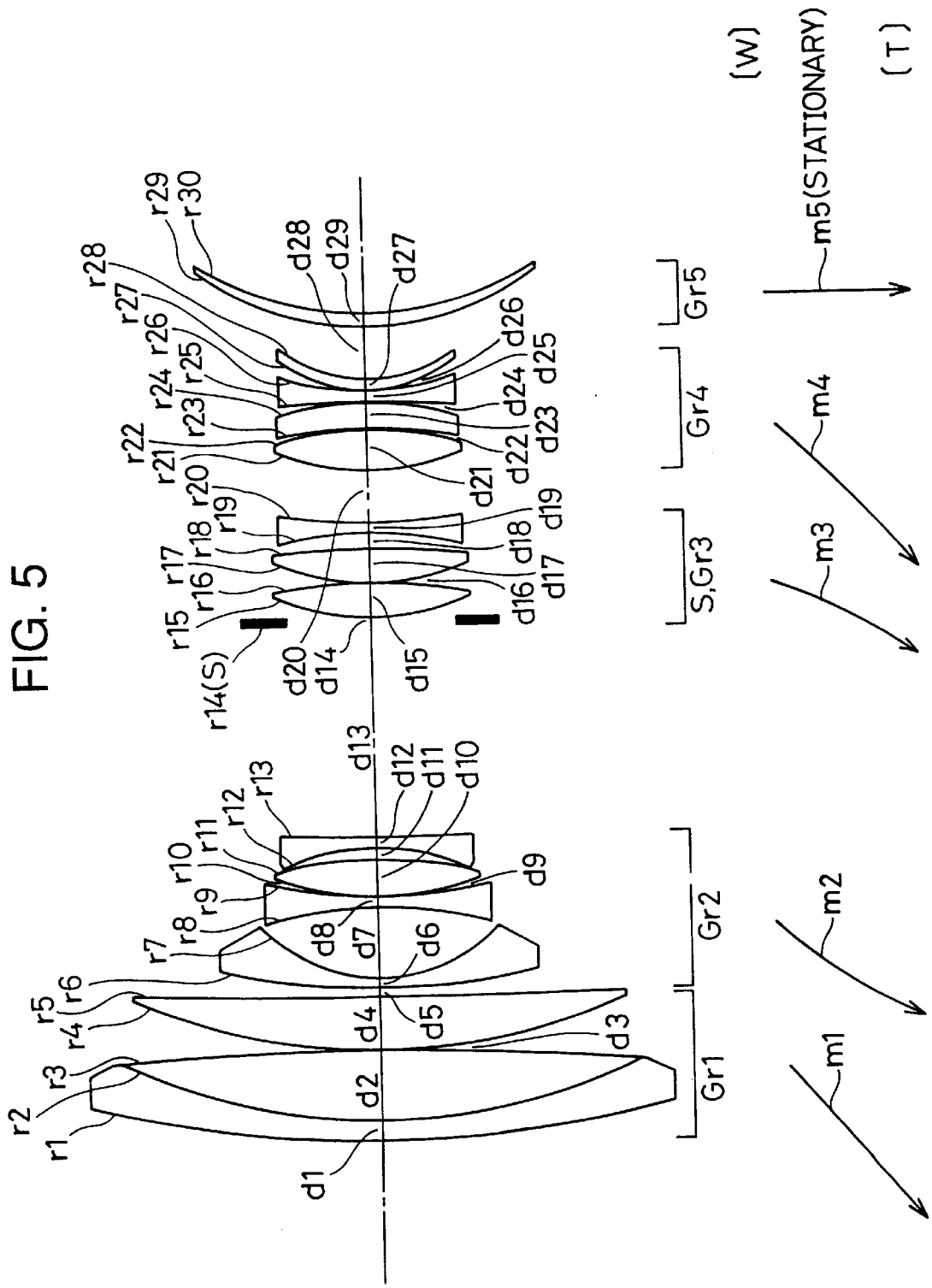
FIG. 5 shows the lens construction of a fifth embodiment.
Figure 6:
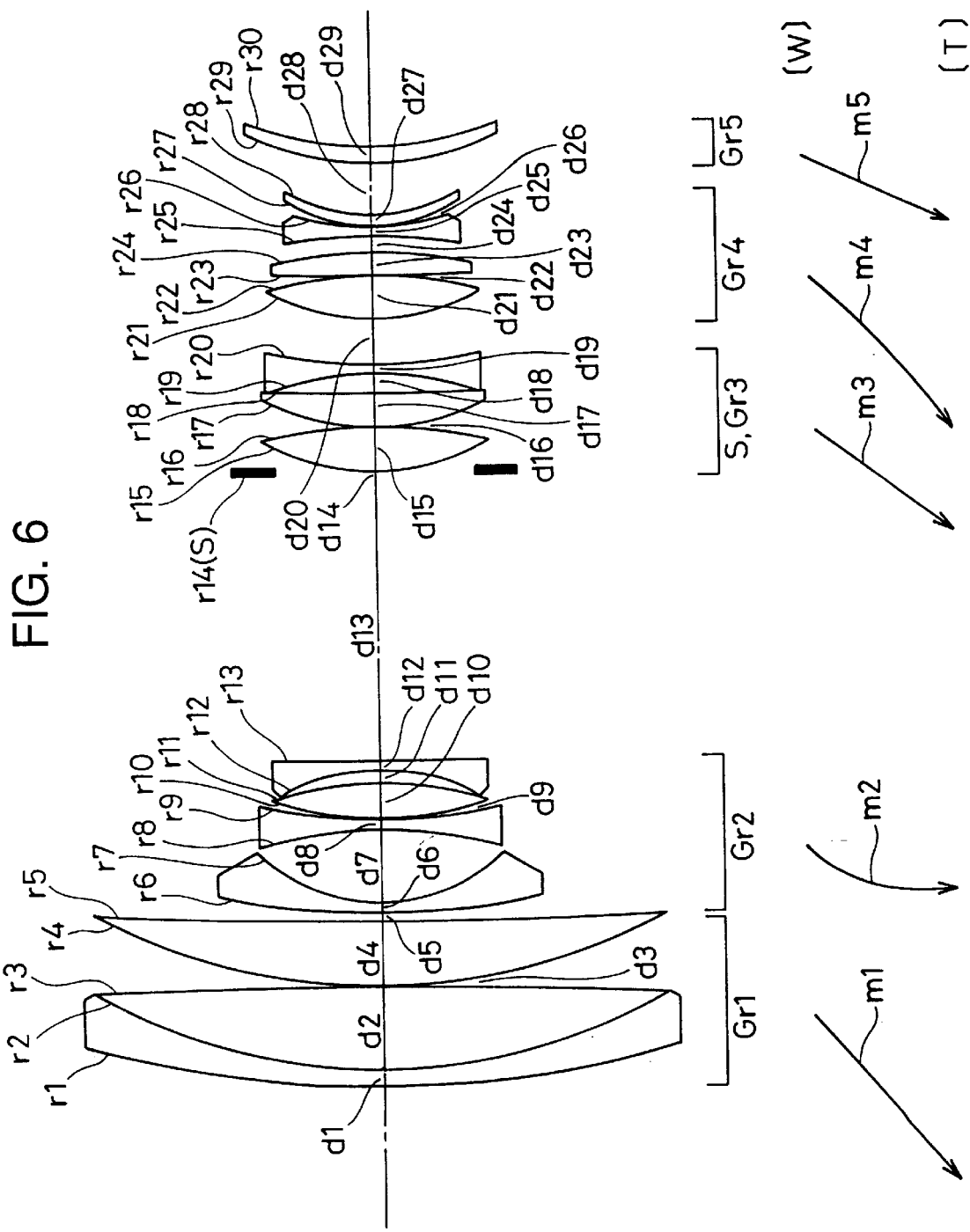
FIG. 6 shows the lens construction of a sixth embodiment.
Figure 7:
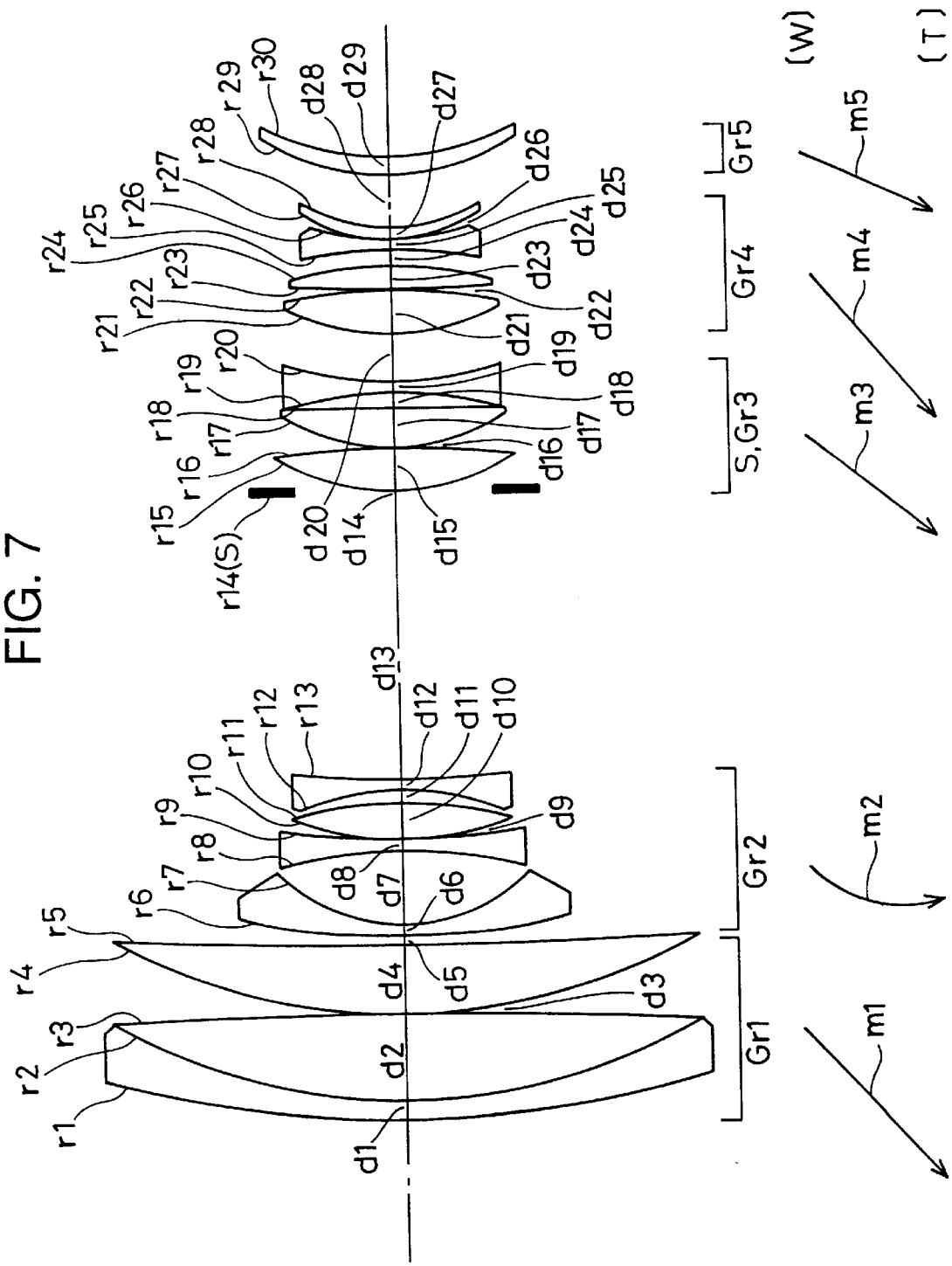
FIG. 7 shows the lens construction of a seventh embodiment.

Zoom lens systems embodying the present invention will hereinafter be described with reference to the drawings. FIGS. 1 to 7 showing the lens constructions of zoom lens systems according to first through seventh embodiments, show the lens arrangements at the shortest focal length condition (W). In the figures, arrows m1 to m5 schematically show the movements of first to fifth lens units Gr1 to Gr5 as the lens is zoomed from the shortest focal length condition (W) to the longest focal length condition (T). In the figures, the surfaces marked with ri (i=1, 2, 3, ...) are ith surfaces counted from the object side and the axial distances marked with di (i=1, 2, 3, ...) are ith axial distances counted from the object side.

The first to seventh embodiments are five-unit zoom lens systems each comprising from the object side a first lens unit Gr1 having a positive optical power, a second lens unit Gr2 having a negative optical power, a third lens unit Gr3 having a positive optical power, a fourth lens unit Gr4 having a positive optical power and a fifth lens unit Gr5 having a positive optical power wherein zooming is performed by varying each of the lens unit-to-lens unit distances. In zooming from the shortest focal length condition (W) to the longest focal length condition (T), at least the first lens unit Gr1, the third lens unit Gr3 and the fourth lens unit Gr4 are moved toward the object side. Between the most image side surface of the second lens unit Gr2 and the most object side surface of the third lens unit Gr3, an aperture stop S is disposed which is moved together with the third lens unit Gr3 for zooming.

In the first embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a bi-concave negative lens element. The third lens unit Gr3 comprises a bi-convex positive lens element, a bi-convex positive lens element and a bi-concave negative lens element. The fourth lens unit Gr4 comprises a bi-convex positive lens element, a positive meniscus lens element convex to the image side, a bi-concave negative lens element and a negative meniscus lens element convex to the object side. The fifth lens unit Gr5 comprises a positive meniscus lens element convex to the object side. The following three surfaces are aspherical: the object side surface of the most object side lens element in the second lens unit Gr2(r6) and the object side surface and the image side surface of the third lens element counted from the object side in the fourth lens unit Gr4(r25 and r26). In zooming from the shortest focal length condition (W) to the longest focal length condition (T), the second lens unit Gr2 is moved to describe a locus convex toward the object side, and the first lens unit Gr1 and the third to fifth lens units Gr3 to Gr5 are moved toward the object side.

In the second embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a bi-concave negative lens element. The third lens unit Gr3 comprises a bi-convex positive lens element, a bi-convex positive lens element and a bi-concave negative lens element. The fourth lens unit Gr4 comprises a bi-convex positive lens element, a positive meniscus lens element convex to the image side, a bi-concave negative lens element and a negative meniscus lens element convex to the object side. The fifth lens unit Gr5 comprises a positive meniscus lens element convex to the object side. The following three surfaces are aspherical: the object side surface of the most object side lens element in the second lens unit Gr2(r6), and the object side surface and the image side surface of the third lens element counted from the object side in the fourth lens unit Gr4(r25 and r26). In zooming from the shortest focal length condition (W) to the longest focal length condition (T), the first to fifth lens units Gr1 to Gr5 are moved toward the object side.

In the third embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a bi-concave negative lens element. The third lens unit Gr3 comprises a bi-convex positive lens element, a bi-convex positive lens element and a bi-concave negative lens element. The fourth lens unit Gr4 comprises a bi-convex positive lens element, a positive meniscus lens element convex to the image side, a bi-concave negative lens element and a negative meniscus lens element convex to the object side. The fifth lens unit Gr5 comprises a positive meniscus lens element convex to the object side. The following three surfaces are aspherical: the object side surface of the most object side lens element in the second lens unit Gr2(r6), and the object side surface and the image side surface of the third lens element counted from the object side in the fourth lens unit Gr2(r25 and r26). In zooming from the shortest focal length condition (W) to the longest focal length condition (T), the second lens unit Gr2 is moved to describe a locus convex toward the object side, and the first lens unit Gr1 and the third to fifth lens units Gr3 to Gr5 are moved toward the object side.

In the fourth embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a bi-concave negative lens element. The third lens unit Gr3 comprises a bi-convex positive lens element, a positive meniscus lens element convex to the object side and a bi-concave negative lens element. The fourth lens unit Gr4 comprises a bi-convex positive lens element, a positive meniscus lens element convex to the image side, a bi-concave negative lens element and a positive meniscus lens element convex to the object side. The fifth lens unit Gr5 comprises a negative meniscus lens element concave to the image side and a positive meniscus lens element convex to the object side. The following three surfaces are aspherical: the object side surface of the most object side lens element in the second lens unit Gr2(r6), and the object side surface and the image side surface of the third lens element counted from the object side in the fourth lens unit Gr4(r25 and r26). In zooming from the shortest focal length condition (W) to the longest focal length condition (T), the second and fifth lens units Gr2 and Gr5 are moved toward the object side to draw convex loci, and the first, third and fourth lens units Gr1, Gr3 and Gr4 are moved toward the object side.

In the fifth embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a bi-concave negative lens element. The third lens unit Gr3 comprises a bi-convex positive lens element, a bi-convex positive lens element and a bi-concave negative lens element. The fourth lens unit Gr4 comprises a bi-convex positive lens element, a positive meniscus lens element convex to the image side, a biconcave negative lens element and a negative meniscus lens element convex to the object side. The fifth lens unit Gr5 comprises a positive meniscus lens element convex to the object side. The following three surfaces are aspherical: the object side surface of the most object side lens element in the second lens unit Gr2(r6), and the object side surface and the image side surface of the third lens element counted from the object side in the fourth lens unit Gr4(r25 and r26). In zooming from the shortest focal length condition (W) to the longest focal length condition (T), the first to fourth lens units Gr1 to Gr4 are moved toward the object side and the fifth lens unit Gr5 is stationary.

In the sixth embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a negative meniscus lens element convex to the image side. The third lens unit Gr3 comprises a bi-convex positive lens element, a positive meniscus lens element convex to the object side and a bi-concave negative lens element. The fourth lens unit Gr4 comprises a bi-convex positive lens element, a positive meniscus lens element convex to the image side, a bi-concave negative lens element and a positive meniscus lens element convex to the object side. The fifth lens unit Gr5 comprises a positive meniscus lens element convex to the object side. The following three surfaces are aspherical: the object side surface of the most object side lens element in the second lens unit Gr2(r6), and the object side surface and the image side surface of the third lens element counted from the object side in the fourth lens unit Gr4(r25 and r26). In zooming from the shortest focal length condition (W) to the longest focal length condition (T), the second lens unit Gr2 is moved to describe a locus convex toward the object side, and the first lens unit Gr1 and the third to fifth lens units Gr3 to Gr5 are moved toward the object side.

In the seventh embodiment, the lens units comprise from the object side the following lens elements: The first lens unit Gr1 comprises a doublet lens element consisting of a negative meniscus lens element convex to the object side and a bi-convex positive lens element, and a positive meniscus lens element convex to the object side. The second lens unit Gr2 comprises a negative meniscus lens element convex to the object side, a bi-concave negative lens element, a bi-convex positive lens element and a biconcave negative lens element. The third lens unit Gr3 comprises a bi-convex positive lens element, a positive meniscus lens element convex to the object side and a bi-concave negative lens element. The fourth lens unit Gr4 comprises a bi-convex positive lens element, a bi-convex positive lens element, a bi-concave negative lens element and a positive meniscus lens element convex to the object side. The fifth lens unit Gr5 comprises a positive meniscus lens element convex to the object side. The following five surfaces are aspherical: the object side surface of the most object side lens element in the second lens unit Gr2(r6), the object side surface of the most object side lens element in the third lens unit Gr3(r15), the object side surface and the image side surface of the third lens element counted from the object side in the fourth lens unit Gr4(r25 and r26), and the most object side surface of the fifth lens unit Gr5(r29). In zooming from the shortest focal length condition (W) to the longest focal length condition (T), the second lens unit Gr2 is moved to describe a locus convex toward the object side, and the first lens unit Gr1 and the third to fifth lens units Gr3 to Gr5 are moved toward the object side.

Now, reasons will be described why size reduction is difficult in conventional high-magnification zoom lens systems. For example, in a zoom type of positive, negative, positive, negative, positive, negative configuration, in order to reduce the total length, it is necessary to decrease the distance between the first and second lens units on the shorter focal length side to increase the composite negative optical power of the first and second lens units. When the negative composite optical power of the first and second lens units is increased, although the total length is reduced because the degree of retro increases, the optical power of the third and succeeding lens units also increases. It is for this reason that the third and succeeding lens units comprise four lens units. This enables the achievement of a zoom ratio of approximately 10×. However, this also increases the size of the third and succeeding lens units. Moreover, in this zoom type, it is necessary to provide some distance between the fourth and fifth lens units to achieve zooming and aberration correction. Consequently, the size of the portion of the third and succeeding lens units further increases, so that the size reduction of the entire lens system is limited. In a zoom type of positive, negative, positive, negative, positive configuration, the third and succeeding lens units comprise three lens units. However, in this type, it is also necessary to provide some distance between the fourth and fifth lens units to achieve zooming and aberration correction, so that the size of the portion of the third and succeeding lens units increases.

In the first to seventh embodiments, to achieve size reduction, a zoom type of positive, negative, positive, positive, positive configuration is employed and zooming is performed by moving at least the first lens unit Gr1, the third lens unit Gr3 and the fourth lens unit Gr4 toward the object side to vary each of the lens unit-to-lens unit distances. Thus, by the arrangement such that the first lens unit Gr1 is not stationary but is moved toward the object side in zooming, size reduction is achieved. By moving the third and fourth lens units Gr3 and Gr4 toward the object side in zooming, the burden imposed on the third and fourth lens units Gr3 and Gr4 for zooming is increased. By increasing the burden imposed on the third and fourth lens units Gr3 and Gr4 for zooming, a high-zoom-ratio zoom lens system is realized.

In the zoom type of positive, negative, positive, positive, positive configuration, increasing the negative composite optical power of the first and second lens units Gr1 and Gr2 at the shortest focal length condition (W) enables the achievement of size reduction of the entire zoom lens system, and increasing the negative optical power of the second lens unit Gr2 enables the achievement of a high zoom ratio. With the increase in the negative optical powers, the positive optical power of the third and succeeding lens units is necessarily increased. Moreover, in order to achieve a high zoom ratio, it is necessary to increase the positive composite optical power of the third and fourth lens units Gr3 and Gr4. When the composite optical power of the third and fourth lens units Gr3 and Gr4 is increased, large aberration (particularly, coma) is generated in the third and fourth lens units Gr3 and Gr4. This aberration can be corrected in the fifth lens unit Gr5. Further, in the fifth lens unit Gr5, image plane correction can be made. To correct aberration generated in the third and fourth lens units Gr3 and Gr4, it is desired that the fifth lens unit Gr5 should have a meniscus lens element convex to the object side.

From the above-described point of view, in the zoom type of positive, negative, positive, positive, positive configuration like the first to seventh embodiments, it is desirable that the condition (1) or (2) shown below should be fulfilled. It is more desirable that both the conditions (1) and (2) should be fulfilled. Fulfilling the conditions (1) and (2) enables the achievement of a zoom lens system that is compact and has high performance in spite of having a high zoom ratio.

$$0.01 \leq |f2/fT| \leq 0.20 \tag{1}$$

$$25 \leq (fT/f34W) \times Z \leq 300 \tag{2}$$

where f2 represents the focal length of the second lens unit Gr2;

fT represents the focal length of the entire lens system at the longest focal length condition (T);

f34W represents the composite focal length of the third and fourth lens units Gr3 and Gr4 at the shortest focal length condition (W); and Z represents the zoom ratio.

The condition (1) defines the focal length of the second lens unit Gr2. As mentioned previously, in the zoom type of positive, negative, positive, positive, positive configuration, a high zoom ratio is achieved by increasing the optical power of the second lens unit Gr2. However, excessively increasing the optical power makes it difficult to correct aberration. That is, when the lower limit of the condition (1) is exceeded to decrease the focal length of the second lens unit Gr2, although this is advantageous to size reduction, it is difficult to correct aberration (particularly, coma on the shorter focal length side). When the upper limit of the condition (1) is exceeded to increase the focal length of the second lens unit Gr2, compactness is lost.

The condition (2) defines the composite focal length of the third and fourth lens units Gr3 and Gr4. When the lower limit of the condition (2) is exceeded, it is difficult to increase the zoom ratio originating from the third and fourth lens units Gr3 and Gr4, so that it is impossible to achieve a high zoom ratio. In addition, compactness is lost. When the upper limit of the condition (2) is exceeded to decrease the composite focal length of the third and fourth lens units Gr3 and Gr4, although this contributes to a high zoom ratio, aberration (particularly, coma) generated in the third and fourth lens units Gr3 and Gr4 cannot be sufficiently corrected in the fifth lens unit Gr5.

Moreover, from the above-described point of view, in the zoom type of positive, negative, positive, positive, positive configuration like the first to seventh embodiments, it is desired that the condition (3) shown below should be fulfilled. Further, it is more desired that all of the conditions (1) to (3) should be fulfilled. Fulfilling tile condition (3) is effective for reducing the size of a high-zoom-ratio and high-performance zoom lens system.

$$0.01 < |f12W/fT| < 0.15 \qquad (3)$$

where f12W represents the composite focal length of the first and second lens units Gr1 and Gr2 at the shortest focal length condition (W).

When the lower limit of the condition (3) is exceeded to decrease the composite focal length f12W of the first and second lens units Gr1 and Gr2, the optical power of the second lens unit Gr2 is too high, so that it is difficult to correct coma and lateral chromatic aberration at the shortest focal length condition (W). When the upper limit of the condition (3) is exceeded, compactness is lost.

Like in the first to seventh embodiments, in the zoom type of positive, negative, positive, positive, positive configuration in which the third and fourth lens units Gr3 and Gr4 are moved toward the object side in zooming, it is desired that the following condition (4) should be fulfilled:

$$0.30 \leq D3/D4 \leq 0.98 \qquad (4)$$

where

D4 represents the movement amount of the fourth lens unit Gr4 from the shortest focal length condition (W) to the longest focal length condition (T); and D3 represents the movement amount of the third lens unit Gr3 from the shortest focal length condition (W) to the longest focal length condition (T).

The condition (4) defines the desired distance between the third and fourth lens units Gr3 and Gr4. Making the distance between the third and fourth lens units Gr3 and Gr4 appropriate is effective for correcting the image plane. When the lower limit of the condition (4) is exceeded, the image plane is excessively corrected or the third lens unit Gr3 cannot sufficiently share the zoom ratio. When the third lens unit Gr3 cannot sufficiently share the zoom ratio, in order to increase the zoom ratio shares of other lens units, it is necessary to increase the optical power or the movement amounts of the lens units. As a result, aberration correction becomes difficult and compactness is lost. When the upper limit of the condition (4) is exceeded, sufficient effects of image plane correction cannot be obtained.

Like in the first to seventh embodiments, in the zoom type of positive, negative, positive, positive, positive configuration, it is desired to provide at least one aspherical surface in the second lens unit Gr2. When the optical power of the second lens unit Gr2 is increased in order to reduce the size of the optical system, negative distortion on the shorter focal length side increases or coma on the shorter focal length side increases. Providing an aspherical surface in the second lens unit Gr2 is effective for correcting these aberrations.

Like in the seventh embodiment, in the zoom type of positive, negative, positive, positive, positive configuration, it is desired to provide at least one aspherical surface in the third lens unit Gr3. When the composite optical power of the first and second lens units Gr1 and Gr2 is increased at the shortest focal length condition (W) in order to reduce the size of the optical system, it is necessary to also increase the optical power of the third and succeeding lens units accordingly. However, if the optical power of the third lens unit Gr3 is increased, spherical aberration inclines toward the under side. Providing an aspherical surface in the third lens unit Gr3 is effective for correcting the inclination of spherical aberration toward the under side.

Like in the first to seventh embodiments, in the zoom type of positive, negative, positive, positive, positive configuration, it is desired to provide at least one aspherical surface in the fourth lens unit Gr4. When the composite optical power of the first and second lens units Gr1 and Gr2 at the shortest focal length condition (W) is increased in order to reduce the size of the optical system, it is necessary to also increase the optical power of the third and succeeding lens units accordingly. However, if the optical power of the fourth lens unit Gr4 is increased, coma at the shortest focal length condition (W) is particularly increased. Providing an aspherical surface in the fourth lens unit Gr4 is effective for correcting coma at the shortest focal length condition (W).

Like in the seventh embodiment, in the zoom type of positive, negative, positive, positive, positive configuration, it is desired to provide at least one aspherical surface in the fifth lens unit Gr5. When the size of the optical system is reduced, the angle of off-axial (particularly, rim) incident light increases in the fifth lens unit Gr5, so that coma generated in the third and fourth lens units Gr3 and Gr4 is excessively corrected. Providing an aspherical surface in the fifth lens unit Gr5 is effective in correcting this.

Tables 1 to 7 list the construction data of examples of the zoom lens systems of the first to seventh embodiments, whose lens arrangements are illustrated in FIGS. 1 to 7, respectively.

The constructions of the zoom lens systems embodying the present invention will hereinafter be described more concretely with reference to construction data and graphic representations of aberrations. First to seventh embodiments shown below as examples correspond to the above-described first to seventh embodiments. The lens construction views (FIGS. 1 to 7) showing the first to seventh embodiments show the lens constructions of the corresponding first to seventh embodiments.

In the construction data of the embodiments, ri (i=1, 2, 3, . . . ) represents the radius of curvature of an ith surface counted from the object side, di (i=1, 2, 3, . . . ) represents an ith axial distance counted from the object side, Ni (i=1, 2, 3, . . . ) and vi (i=1, 2, 3, . . . ) represent the refractive index (Nd) and the Abbe number (vd) to the d-line of an ith lens element counted from the object side. In the construction data, the axial distances (variable distances) varied in zooming are axial distances at the shortest focal length condition (W), at the middle focal length condition (M) and at the longest focal length condition (T). The focal lengths f and the F-numbers FNO of the entire lens system corresponding to the focal length conditions (W), (M) and (T) are also shown.

The surfaces marked with asterisks at the radius of curvature ri are aspherical and defined by the following equation (AS) expressing an aspherical surface configuration:

$$X = \frac{C \cdot Y^2}{1 + (1 - \epsilon \cdot Y^2 \cdot C^2)^{1/2}} + \sum_i A_i Y^i \quad (AS)$$

where

X represents the displacement from the reference surface in the optical axis direction;

Y represents the height in a direction perpendicular to the optical axis;

C represents the paraxial curvature;

$\epsilon$ represents the quadric surface parameter; and

Ai represents the aspherical coefficient of the i-th order.

Table 8 shows corresponding values of the conditions (1) to (4) in the embodiments. As is apparent from Table 8, the first to seventh embodiments fulfill the conditions (1) to (4).

Figure 8A:
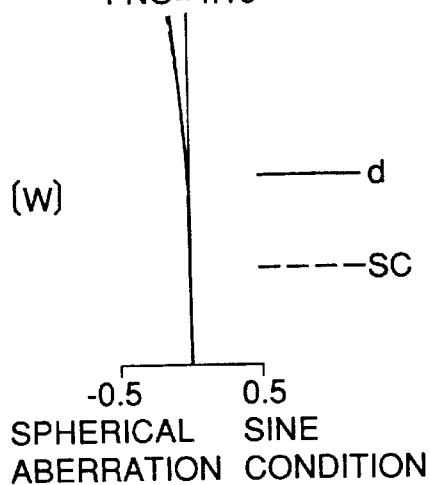
FIGS. 8A to 8I are graphic representations of aberrations in the first embodiment.
Figure 8B:
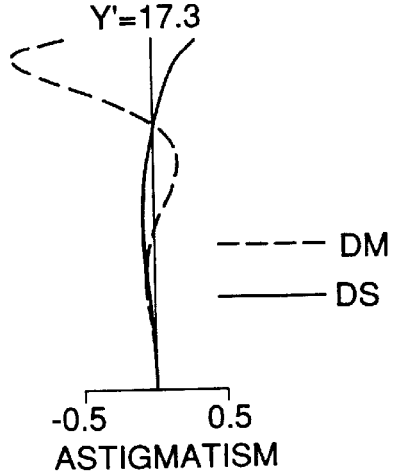
Figure 8C:
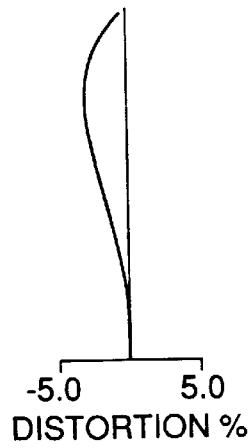
Figure 8D:
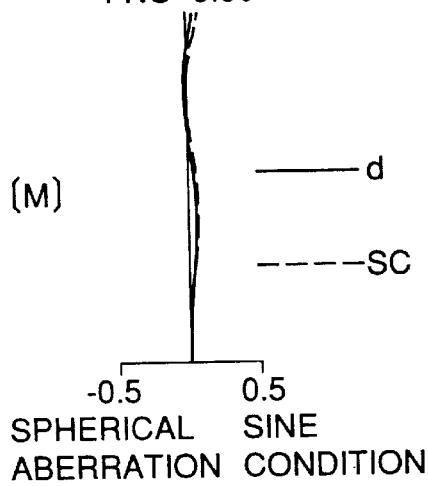
Figure 8E:
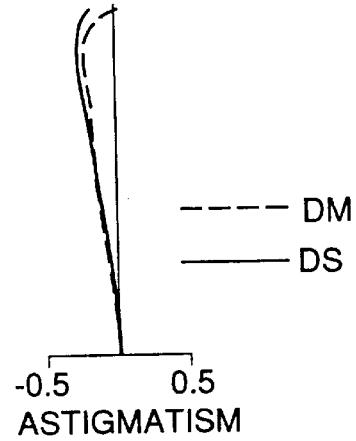
Figure 8F:
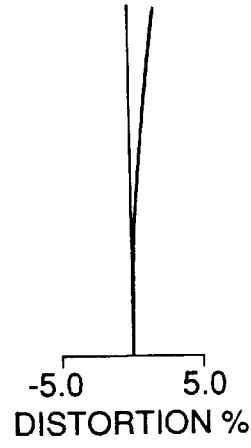
Figure 8G:
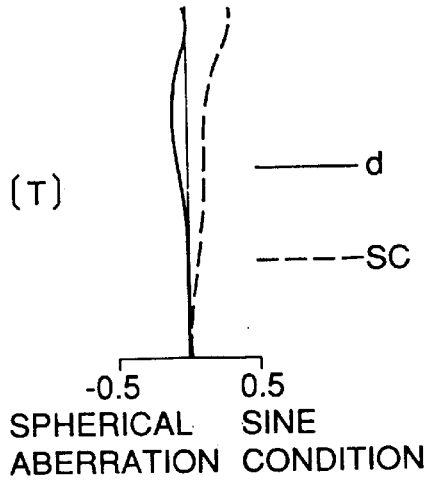
Figure 8H:
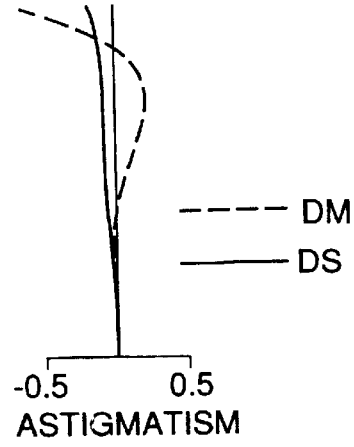
Figure 8I:
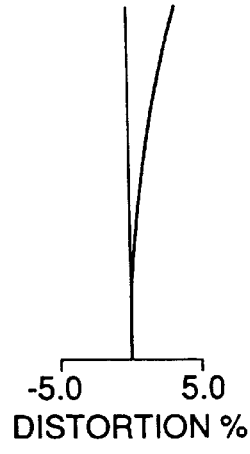
Figure 10A:
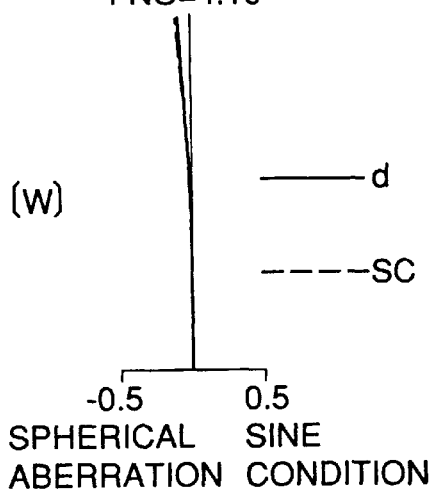
FIGS. 10A to 10I are graphic representations of aberrations in the third embodiment.
Figure 10B:
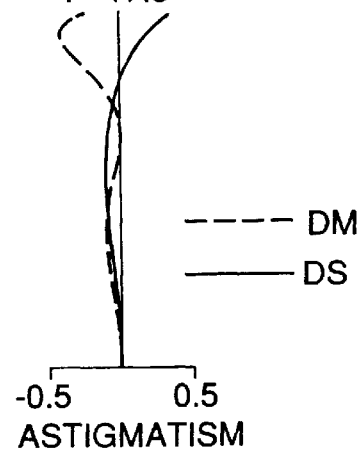
Figure 10C:
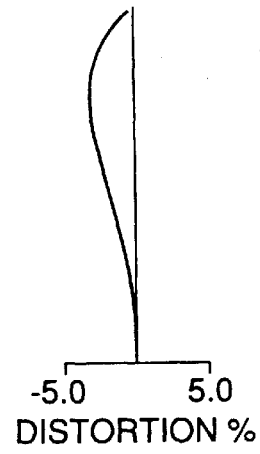
Figure 10D:
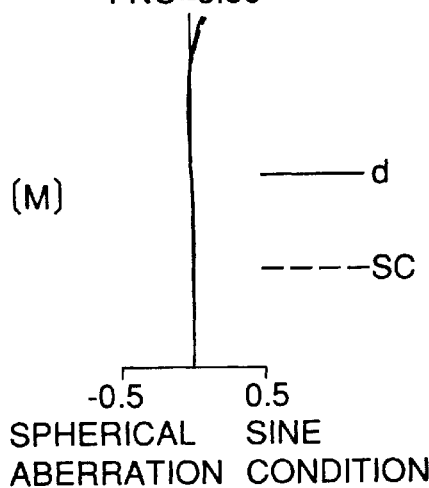
Figure 10E:
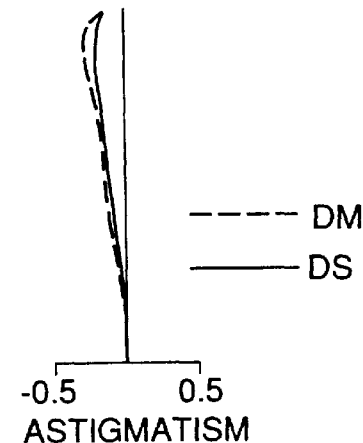
Figure 10F:
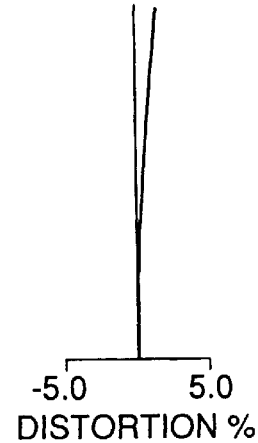
Figure 10G:
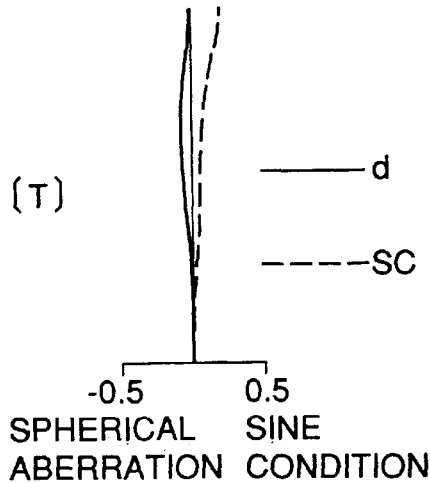
Figure 10H:
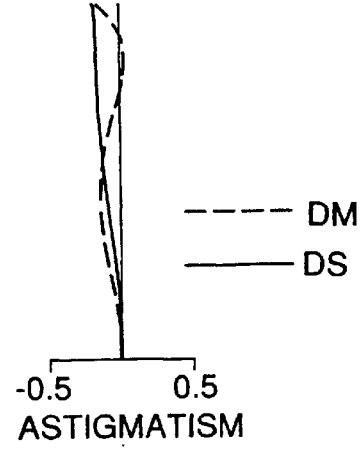
Figure 10I:
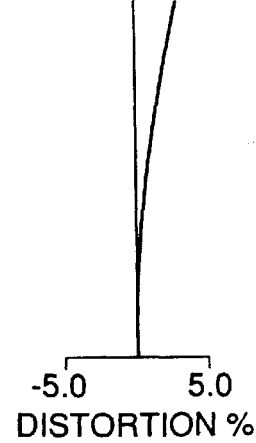
Figure 11A:
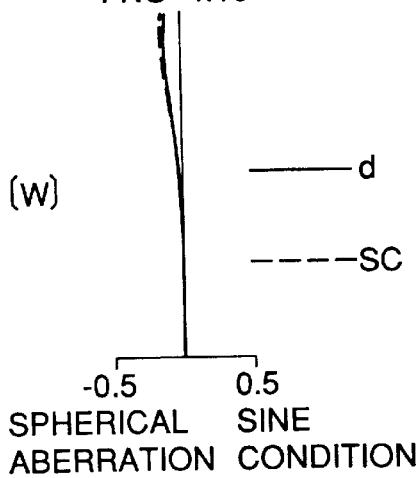
FIGS. 11A to 11I are graphic representations of aberrations in the fourth embodiment.
Figure 11B:
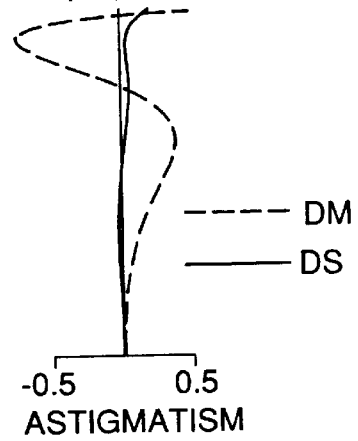
Figure 11C:
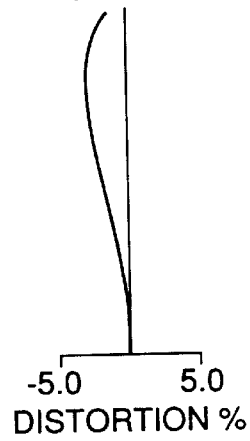
Figure 11D:
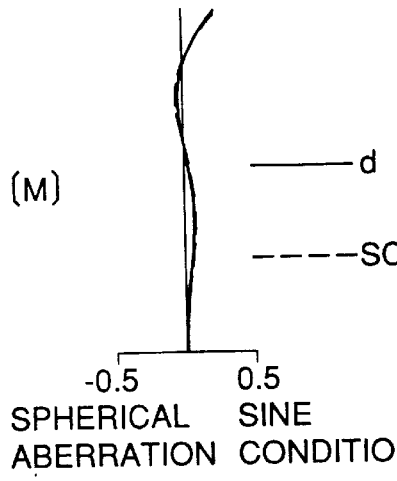
Figure 11E:
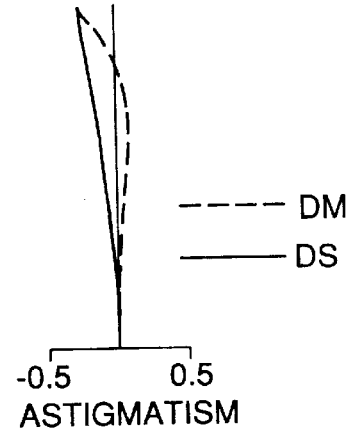
Figure 11F:
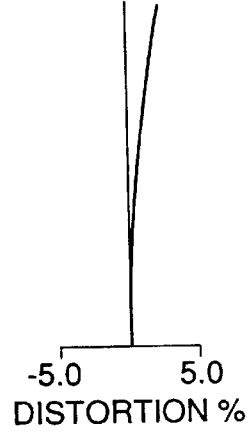
Figure 11G:
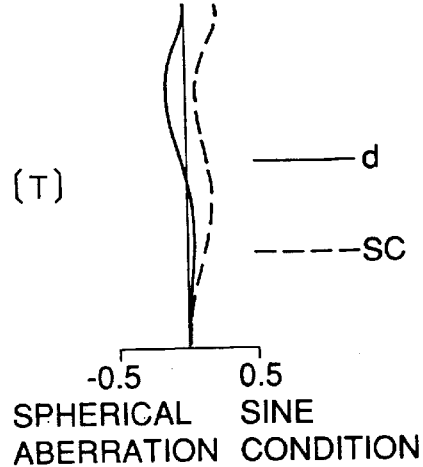
Figure 11H:
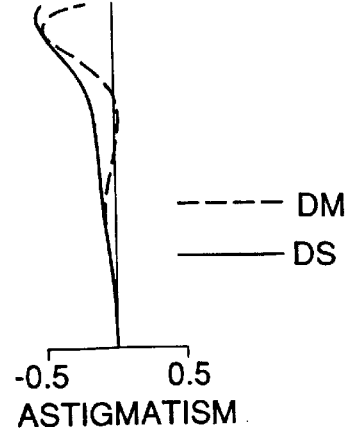
Figure 11I:
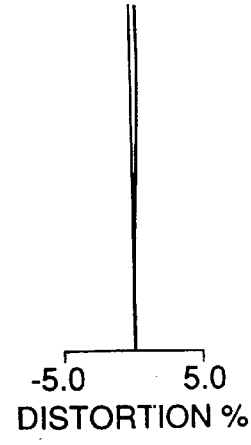
Figure 12A:
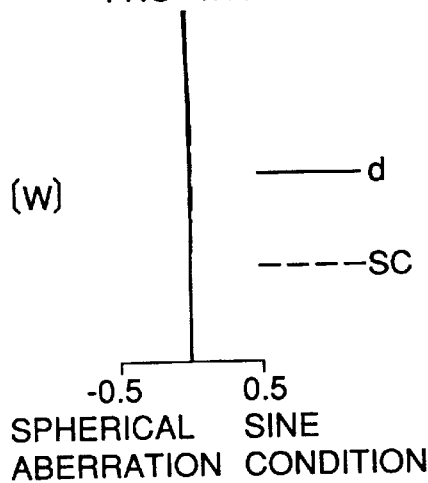
FIGS. 12A to 12I are graphic representations of aberrations in the fifth embodiment.
Figure 12B:
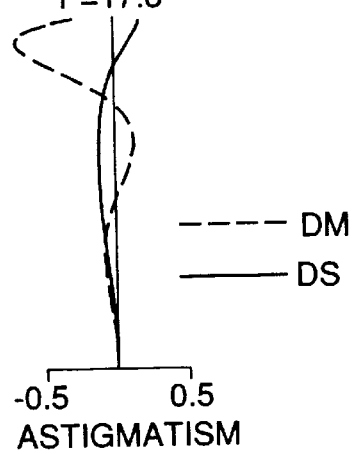
Figure 12C:
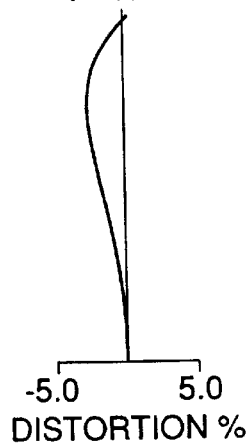
Figure 12D:
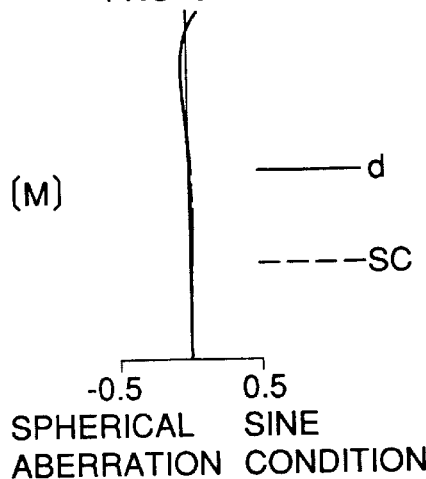
Figure 12E:
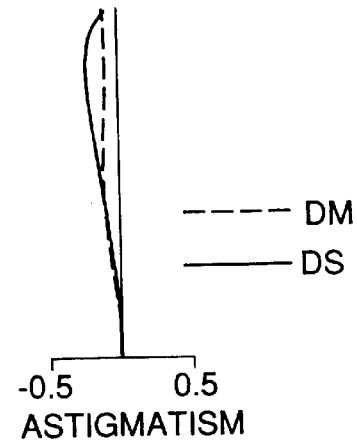
Figure 12F:
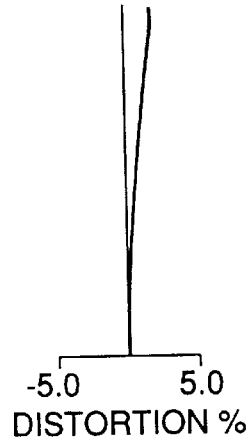
Figure 12G:
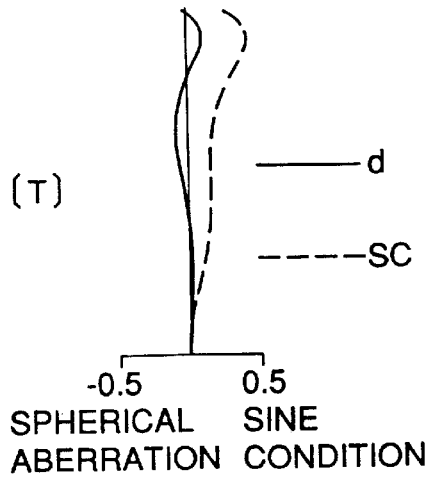
Figure 12H:
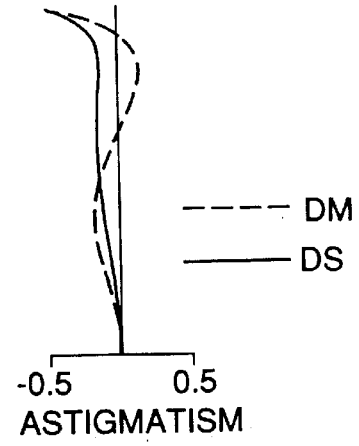
Figure 12I:
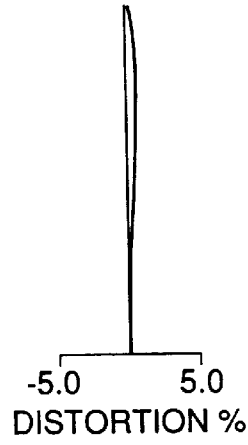
Figure 13A:
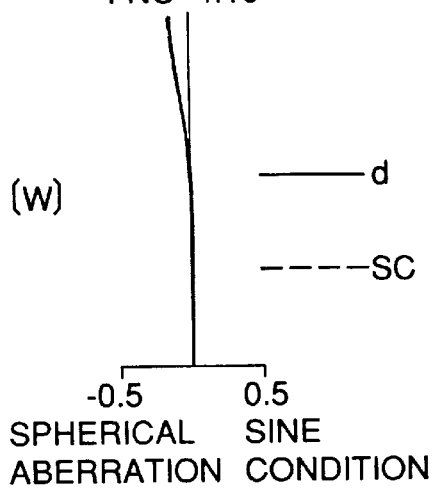
FIGS. 13A to 13I are graphic representations of aberrations in the sixth embodiment.
Figure 13B:
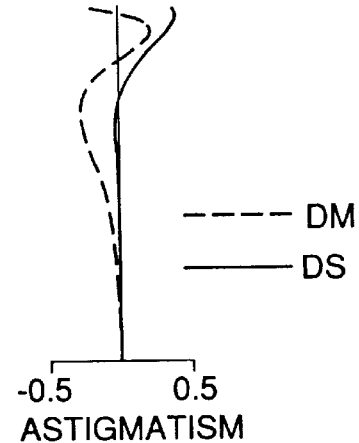
Figure 13C:
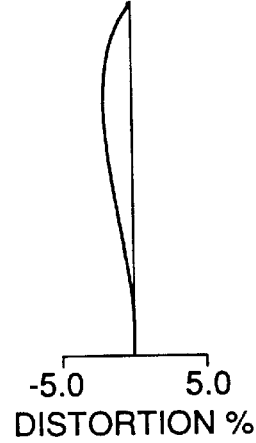
Figure 13D:
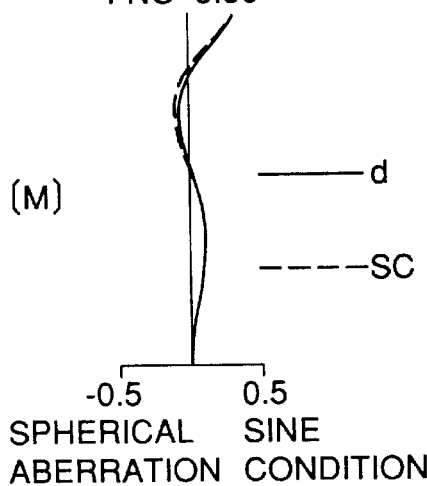
Figure 13E:
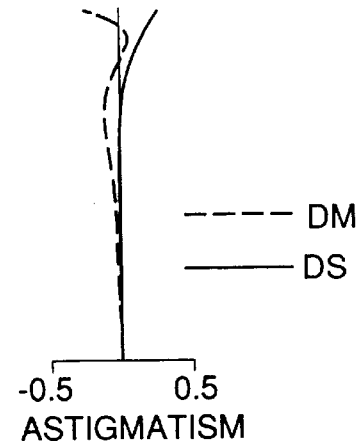
Figure 13F:
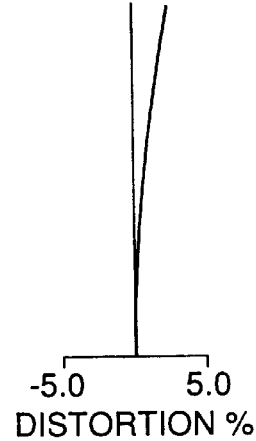
Figure 13G:
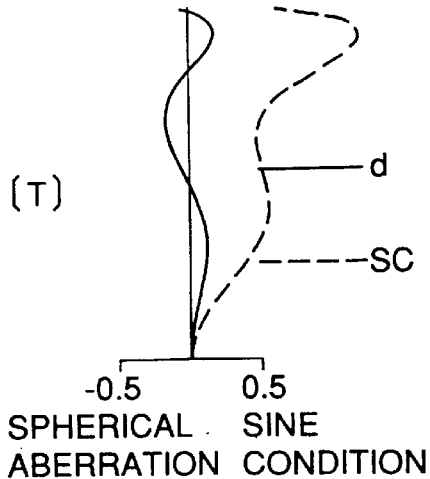
Figure 13H:
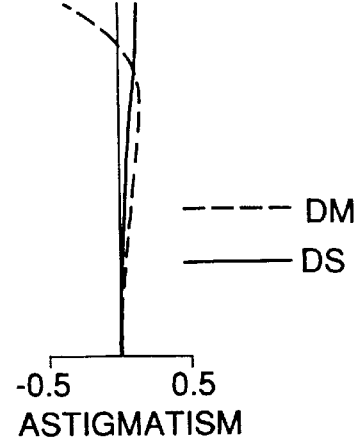
Figure 13I:
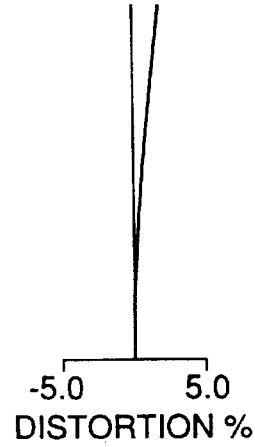
Figure 14A:
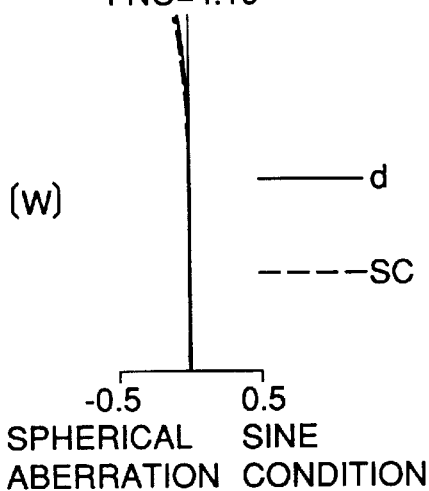
FIGS. 14A to 14I are graphic representations of aberrations in the seventh embodiment.
Figure 14B:
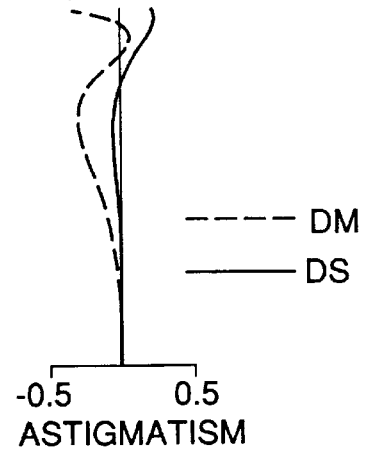
Figure 14C:
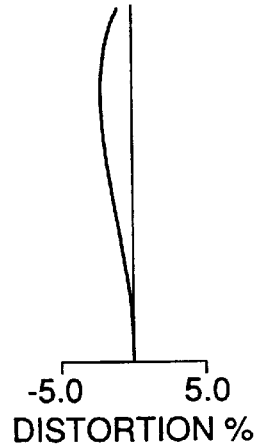
Figure 14D:
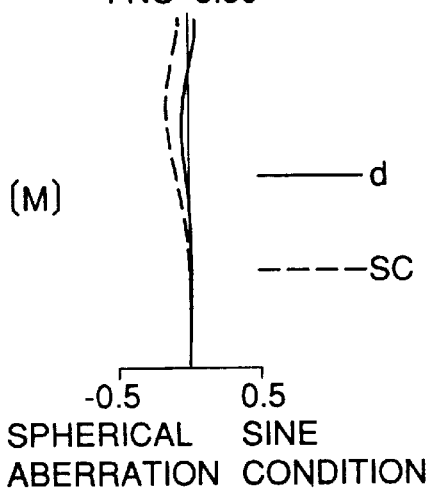
Figure 14E:
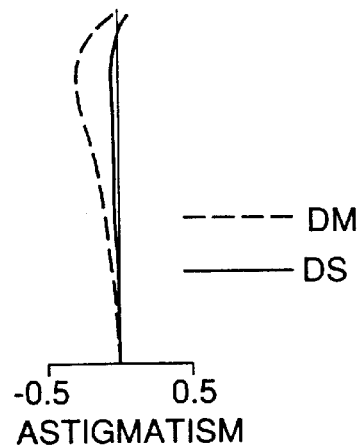
Figure 14F:
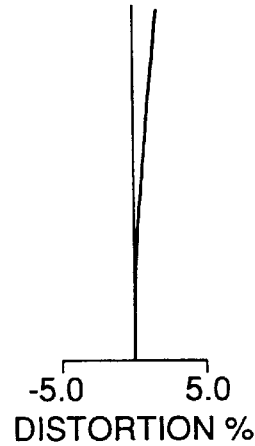
Figure 14G:
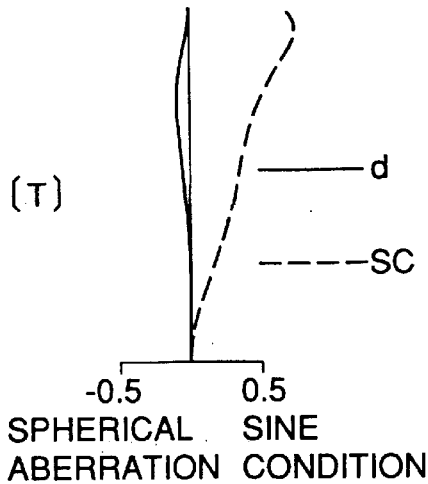
Figure 14H:
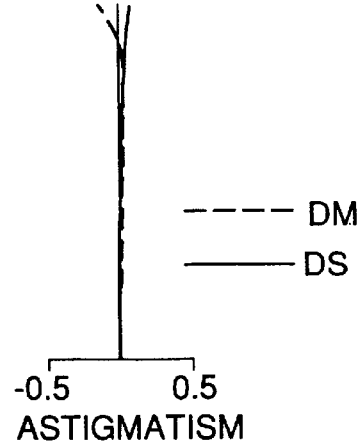
Figure 14I:
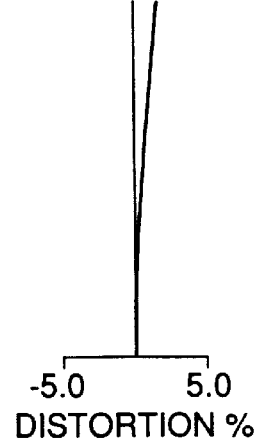

FIGS. 8A to 8I through 14A to 14I are graphic representations of aberrations corresponding to the first to seventh embodiments. In the figures, (W), (M) and (T) show aberrations (from the left, spherical aberration, etc., astigmatism and distortion; Y': image height) at the shortest focal length condition, at the middle focal length condition and at the longest focal length condition, respectively. In the figures, the solid line d represents aberration to the d-line and the broken line SC represents sine condition. The broken line DM and the solid line DS represent astigmatisms to the d-line on the meridional image plane and on the sagittal image plane, respectively.

As described above, according to the first and second aspects of the present invention, a high-performance and high-zoom-ratio zoom lens system being small in total length is realized. Moreover, according to the second aspect of the invention, size reduction and higher performance are effectively achieved.

Obviously, many modifications and variations of the present invention are possible in light of the above teachings. It is therefore to be understood that within the scope of the appended claims, the invention may be practiced other than as specifically described.

TABLE 1

<< Embodiment 1 >> f = 22.5 ~ 68.2 ~ 215.0
FNO = 4.1 ~ 5.5 ~ 5.8

| Radius of Curvature | Axial Distance | Refractive Index | Abbe Number |
|---|---|---|---|
| {First Lens Unit Gr1 ... Positive} | | | |
| r1 = 112.210 | | | |
| | d1 = 1.800 | N1 = 1.83400 | v1 = 37.05 |
| r2 = 52.805 | | | |
| | d2 = 6.300 | N2 = 1.49310 | v2 = 83.58 |
| r3 = −477.101 | | | |
| | d3 = 0.100 | | |
| r4 = 48.573 | | | |
| | d4 = 5.340 | N3 = 1.49310 | v3 = 83.58 |
| r5 = 399.715 | | | |
| | d5 = 0.899 ~ 20.582 ~ 50.854 | | |
| {Second Lens Unit Gr2 ... Negative} | | | |
| r6* = 81.522 | | | |
| | d6 = 1.000 | N4 = 1.61720 | v4 = 54.00 |
| r7 = 15.450 | | | |
| | d7 = 6.630 | | |
| r8 = −36.156 | | | |
| | d8 = 1.000 | N5 = 1.75450 | v5 = 51.57 |
| r9 = 53.164 | | | |
| | d9 = 0.100 | | |
| r10 = 28.759 | | | |
| | d10 = 3.510 | N6 = 1.75000 | v6 = 25.14 |
| r11 = −35.866 | | | |
| | d11 = 1.120 | | |
| r12 = −21.249 | | | |
| | d12 = 1.000 | N7 = 1.75450 | v7 = 51.57 |
| r13 = 177.471 | | | |
| | d13 = 22.318 ~ 10.118 ~ 0.700 | | |
| {Aperture Stop S} | | | |
| r14 = ∞ | | | |
| | d14 = 0.100 | | |
| {Third Lens Unit Gr3 ... Positive} | | | |
| r15 = 21.882 | | | |
| | d15 = 3.180 | N8 = 1.48749 | v8 = 70.44 |
| r16 = −49.561 | | | |
| | d16 = 0.100 | | |
| r17 = 20.637 | | | |
| | d17 = 3.240 | N9 = 1.48749 | v9 = 70.44 |
| r18 = −93.046 | | | |
| | d18 = 1.640 | | |
| r19 = −30.313 | | | |
| | d19 = 1.000 | N10 = 1.80741 | v10 = 31.59 |
| r20 = 51.204 | | | |
| | d20 = 4.850 ~ 1.282 ~ 0.097 | | |
| {Fourth Lens Unit Gr4 ... Positive} | | | |
| r21 = 22.596 | | | |
| | d21 = 3.660 | N11 = 1.50378 | v11 = 66.89 |
| r22 = −32.660 | | | |
| | d22 = 0.100 | | |
| r23 = −62.642 | | | |
| | d23 = 2.410 | N12 = 1.79850 | v12 = 22.60 |
| r24 = −29.155 | | | |
| | d24 = 0.270 | | |
| r25* = −77.590 | | | |
| | d25 = 1.000 | N13 = 1.77551 | v13 = 37.90 |
| r26* = 28.487 | | | |
| | d26 = 0.100 | | |
| r27 = 13.350 | | | |
| | d27 = 1.000 | N14 = 1.48749 | v14 = 70.44 |
| r28 = 12.791 | | | |
| | d28 = 5.000 ~ 16.330 ~ 10.897 | | |
| {Fifth Lens Unit Gr5 ... Positive} | | | |
| r29 = 22.703 | | | |
| | d29 = 1.510 | N15 = 1.75450 | v15 = 51.57 |
| r30 = 24.860 | | | |

TABLE 1-continued

<< Embodiment 1 >>

[Aspherical Coefficients]

r6: $\epsilon = 1.0000$
  $A4 = 0.67660 \times 10^{-5}$
  $A6 = -0.38916 \times 10^{-7}$
  $A8 = 0.80677 \times 10^{-9}$
  $A10 = -0.90846 \times 10^{-11}$
  $A12 = 0.66876 \times 10^{-13}$
  $A14 = -0.25054 \times 10^{-15}$
  $A16 = 0.37459 \times 10^{-18}$
r25: $\epsilon = 1.0000$
  $A4 = -0.70854 \times 10^{-5}$
  $A6 = -0.14836 \times 10^{-7}$
  $A8 = -0.83912 \times 10^{-8}$
  $A10 = -0.97479 \times 10^{-11}$
  $A12 = 0.85091 \times 10^{-12}$
  $A14 = 0.21704 \times 10^{-13}$
  $A16 = -0.27577 \times 10^{-15}$
r26: $\epsilon = 1.0000$
  $A4 = 0.65700 \times 10^{-4}$
  $A6 = 0.29621 \times 10^{-6}$
  $A8 = -0.11288 \times 10^{-7}$
  $A10 = -0.31721 \times 10^{-10}$
  $A12 = 0.22661 \times 10^{-11}$
  $A14 = 0.17391 \times 10^{-13}$
  $A16 = -0.36261 \times 10^{-15}$

TABLE 2

<< Embodiment 2 >>

$f = 22.5 \sim 68.2 \sim 215.0$
$FNO = 4.1 \sim 5.5 \sim 5.8$

| Radius of Curvature | Axial Distance | Refractive Index | Abbe Number |
|---|---|---|---|
| {First Lens Unit Gr1 ... Positive} | | | |
| r1 = 111.532 | | | |
| | d1 = 1.800 | N1 = 1.83400 | ν1 = 37.05 |
| r2 = 53.939 | | | |
| | d2 = 6.300 | N2 = 1.49310 | ν2 = 83.58 |
| r3 = -459.002 | | | |
| | d3 = 0.100 | | |
| r4 = 49.474 | | | |
| | d4 = 5.340 | N3 = 1.49310 | ν3 = 83.58 |
| r5 = 389.658 | | | |
| | d5 = 0.899 ~ 21.119 ~ 49.282 | | |
| {Second Lens Unit Gr2 ... Negative} | | | |
| r6* = 81.484 | | | |
| | d6 = 1.000 | N4 = 1.61720 | ν= 54.00 |
| r7 = 15.452 | | | |
| | d7 = 6.630 | | |
| r8 = -36.078 | | | |
| | d8 = 1.000 | N5 = 1.75450 | ν5 = 51.57 |
| r9 = 54.875 | | | |
| | d9 = 0.100 | | |
| r10 = 28.648 | | | |
| | d10 = 3.510 | N6 = 1.75000 | ν6 = 25.14 |
| r11 = -36.737 | | | |
| | d11 = 1.120 | | |
| r12 = -21.151 | | | |
| | d12 = 1.000 | N7 = 1.75450 | ν7 = 51.57 |
| r13 = 184.647 | | | |
| | d13 = 21.762 ~ 9.674 ~ 0.700 | | |
| {Aperture Stop S} | | | |
| r14 = ∞ | | | |
| | d14 = 0.100 | | |
| {Third Lens Unit Gr3 ... Positive} | | | |
| r15 = 21.710 | | | |
| | d15 = 3.180 | N8 = 1.48749 | ν8 = 70.44 |

TABLE 2-continued

<< Embodiment 2 >>

| | | | |
|---|---|---|---|
| r16 = -49.288 | | | |
| | d16 = 0.100 | | |
| r17 = 20.752 | | | |
| | d17 = 3.240 | N9 = 1.48749 | ν9 = 70.44 |
| r18 = -103.029 | | | |
| | d18 = 1.640 | | |
| r19 = -30.657 | | | |
| | d19 = 1.000 | N10 = 1.80741 | ν10 = 31.59 |
| r20 = 52.901 | | | |
| | d20 = 4.850 ~ 1.350 ~ 0.450 | | |
| {Fourth Lens Unit Gr4 ... Positive} | | | |
| r21 = 22.630 | | | |
| | d21 = 3.660 | N11 = 1.50378 | ν11 = 66.89 |
| r22 = -32.955 | | | |
| | d22 = 0.100 | | |
| r23 = -59.941 | | | |
| | d23 = 2.410 | N12 = 1.79850 | ν12 = 22.60 |
| r24 = -29.499 | | | |
| | d24 = 0.270 | | |
| r25* = -82.492 | | | |
| | d25 = 1.000 | N13 = 1.77551 | ν13 = 37.90 |
| r26* = 27.975 | | | |
| | d26 = 0.100 | | |
| r27 = 13.222 | | | |
| | d27 = 1.000 | N14 = 1.48749 | ν14 = 70.44 |
| r28 = 12.872 | | | |
| | d28 = 5.000 ~ 16.149 ~ 19.987 | | |
| {Fifth Lens Unit Gr5 ... Positive} | | | |
| r29 = 25.688 | | | |
| | d29 = 1.510 | N15 = 1.75450 | ν15 = 51.57 |
| r30 = 30.013 | | | |

[Aspherical Coefficients]

r6: $\epsilon = 1.0000$
  $A4 = 0.73951 \times 10^{-5}$
  $A6 = -0.38618 \times 10^{-7}$
  $A8 = 0.80394 \times 10^{-9}$
  $A10 = -0.91685 \times 10^{-11}$
  $A12 = 0.67985 \times 10^{-13}$
  $A14 = -0.25355 \times 10^{-15}$
  $A16 = 0.37459 \times 10^{-10-18}$
r25: $\epsilon = 1.0000$
  $A4 = -0.70682 \times 10^{-5}$
  $A6 = -0.14312 \times 10^{-7}$
  $A8 = -0.84007 \times 10^{-8}$
  $A10 = -0.10069 \times 10^{-10}$
  $A12 = 0.84118 \times 10^{-12}$
  $A14 = 0.21686 \times 10^{-13}$
  $A16 = -0.27577 \times 10^{-15}$
r26: $\epsilon = 1.0000$
  $A4 = 0.65810 \times 10^{-4}$
  $A6 = 0.29695 \times 10^{-5}$
  $A8 = -0.11289 \times 10^{-7}$
  $A10 = -0.32099 \times 10^{-10}$
  $A12 = 0.22579 \times 10^{-11}$
  $A14 = 0.17298 \times 10^{-1}$
  $A16 = -0.36261 \times 10^{-15}$

TABLE 3

<< Embodiment 3 >>

$f = 22.5 \sim 68.2 \sim 215.0$
$FNO = 4.1 \sim 5.5 \sim 5.8$

| Radius of Curvature | Axial Distance | Refractive Index | Abbe Number |
|---|---|---|---|
| {First Lens Unit Gr1 ... Positive} | | | |
| r1 = 110.602 | | | |
| | d1 = 1.800 | N1 = 1.83400 | ν1 = 37.05 |

TABLE 3-continued

<< Embodiment 3 >>

| | | | |
|---|---|---|---|
| r2 = 53.200 | | | |
| | d2 = 6.700 | N2 = 1.49310 | ν2 = 83.58 |
| r3 = -377.293 | | | |
| | d3 = 0.100 | | |
| r4 = 47.435 | | | |
| | d4 = 5.400 | N3 = 1.49310 | ν3 = 83.58 |
| r5 = 289.611 | | | |
| | d5 = 0.899 ~ 22.118 ~ 50.328 | | |
| | {Second Lens Unit Gr2 ... Negative} | | |
| r6* = 83.877 | | | |
| | d6 = 1.000 | N4 = 1.61720 | ν4 = 54.00 |
| r7 = 14.998 | | | |
| | d7 = 6.930 | | |
| r8 = -35.169 | | | |
| | d8 = 1.000 | N5 = 1.75450 | ν5 = 51.57 |
| r9 = 43.882 | | | |
| | d9 = 0.100 | | |
| r10 = 27.783 | | | |
| | d10 = 3.440 | N6 = 1.75000 | ν6 = 25.14 |
| r11 = -32.700 | | | |
| | d11 = 0.940 | | |
| r12 = -20.723 | | | |
| | d12 = 1.000 | N7 = 1.75450 | ν7 = 51.57 |
| r13 = 241.171 | | | |
| | d13 = 21.445 ~ 10.154 ~ 0.700 | | |
| | {Aperture Stop S} | | |
| r14 = ∞ | | | |
| | d14 = 0.100 | | |
| | {Third Lens Unit Gr3 ... Positive} | | |
| r15 = 21.489 | | | |
| | d15 = 2.927 | N8 = 1.48749 | ν8 = 70.44 |
| r16 = -64.867 | | | |
| | d16 = 0.100 | | |
| r17 = 21.540 | | | |
| | d17 = 3.527 | N9 = 1.48749 | ν9 = 70.44 |
| r18 = -66.531 | | | |
| | d18 = 1.546 | | |
| r19 = -28.061 | | | |
| | d19 = 1.000 | N10 = 1.80741 | ν10 = 31.59 |
| r20 = 62.424 | | | |
| | d20 = 4.398 ~ 1.437 ~ 0.198 | | |
| | {Fourth Lens Unit Gr4 ... Positive} | | |
| r21 = 22.465 | | | |
| | d21 = 3.930 | N11 = 1.50378 | ν11 = 66.89 |
| r22 = -30.496 | | | |
| | d22 = 0.100 | | |
| r23 = -50.942 | | | |
| | d23 = 2.040 | N12 = 1.79850 | ν12 = 22.60 |
| r24 = -30.153 | | | |
| | d24 = 1.500 | | |
| r25* = -48.453 | | | |
| | d25 = 1.000 | N13 = 1.77551 | ν13 = 37.90 |
| r26* = 38.014 | | | |
| | d26 = 0.100 | | |
| r27 = 14.831 | | | |
| | d27 = 1.000 | N14 = 1.48749 | ν14 = 70.44 |
| r28 = 13.819 | | | |
| | d28 = 5.000 ~ 16.012 ~ 10.219 | | |
| | {Fifth Lens Unit Gr5 ... Positive} | | |
| r29 = 26.798 | | | |
| | d29 = 1.650 | N15 = 1.75450 | ν15 = 51.57 |
| r30 = 34.248 | | | |

[Aspherical Coefficients]

r6: ε = 1.0000
A4 = 0.68630 × $10^{-5}$
A6 = -0.35500 × $10^{-7}$
A8 = 0.73388 × $10^{-9}$
A10 = -0.84946 × $10^{-11}$
A12 = 0.64156 × $10^{-13}$
A14 = -0.24657 × $10^{-15}$
A16 = 0.37584 × $10^{-18}$
r25: ε = 1.0000
A4 = -0.83708 × $10^{-5}$
A6 = 0.14399 × $10^{-8}$
A8 = -0.88323 × $10^{-8}$
A10 = -0.72662 × $10^{-11}$
A12 = 0.80843 × $10^{-12}$
A14 = 0.21851 × $10^{-13}$
A16 = -0.27542 × $10^{-15}$
r26: ε = 1.0000
A4 = 0.67745 × $10^{-4}$
A6 = 0.28307 × $10^{-6}$
A8 = -0.10127 × $10^{-7}$
A10 = -0.41213 × $10^{-10}$
A12 = 0.21062 × $10^{-11}$
A14 = 0.16310 × $10^{-13}$
A16 = -0.33318 × $10^{-15}$

TABLE 4

<< Embodiment 4 >> f = 22.5 ~ 68.2 ~ 215.0
FNO = 4.1 ~ 5.5 ~ 5.8

| Radius of Curvature | Axial Distance | Refractive Index | Abbe Number |
|---|---|---|---|
| {First Lens Unit Gr1 ... Positive} | | | |
| r1 = 90.735 | | | |
| | d1 = 0.950 | N1 = 1.85026 | ν1 = 32.15 |
| r2 = 56.594 | | | |
| | d2 = 7.140 | N2 = 1.49310 | ν2 = 83.58 |
| r3 = -400.314 | | | |
| | d3 = 0.100 | | |
| r4 = 49.902 | | | |
| | d4 = 5.100 | N3 = 1.49310 | ν3 = 83.58 |
| r5 = 201.322 | | | |
| | d5 = 0.899 ~ 22.153 ~ 47.451 | | |
| | {Second Lens Unit Gr2 ... Negative} | | |
| r6* = 80.816 | | | |
| | d6 = 0.950 | N4 = 1.80750 | ν4 = 35.43 |
| r7 = 16.132 | | | |
| | d7 = 6.570 | | |
| r8 = -34.551 | | | |
| | d8 = 0.950 | N5 = 1.56873 | ν5 = 63.10 |
| r9 = 52.109 | | | |
| | d9 = 0.100 | | |
| r10 = 27.252 | | | |
| | d10 = 3.830 | N6 = 1.79850 | ν6 = 22.60 |
| r11 = -53.451 | | | |
| | d11 = 1.400 | | |
| r12 = -24.606 | | | |
| | d12 = 0.950 | N7 = 1.78831 | ν7 = 47.32 |
| r13 = 193.497 | | | |
| | d13 = 25.382 ~ 12.193 ~ 0.700 | | |
| | {Aperture Stop S} | | |
| r14 = ∞ | | | |
| | d14 = 0.100 | | |
| | {Third Lens Unit Gr3 ... Positive} | | |
| r15 = 14.769 | | | |
| | d15 = 5.770 | N8 = 1.48749 | ν8 = 70.44 |
| r16 = -37.788 | | | |
| | d16 = 0.100 | | |
| r17 = 18.837 | | | |
| | d17 = 2.540 | N9 = 1.48749 | ν9 = 70.44 |
| r18 = 13997.761 | | | |
| | d18 = 1.440 | | |
| r19 = -21.158 | | | |
| | d19 = 0.950 | N10 = 1.80741 | ν10 = 31.59 |

TABLE 4-continued

<< Embodiment 4 >> r20 = 46.332
  d20 = 3.860 ~ 1.100 ~ 1.066
  {Fourth Lens Unit Gr4 ... Positive} r21 = 34.358
  d21 = 3.250    N11 = 1.51823    ν11 = 58.96
r22 = −18.645
  d22 = 0.100
r23 = −26.459
  d23 = 1.680    N12 = 1.80518    ν12 = 25.43
r24 = −17.522
  d24 = 0.100
r25* = −24.716
  d25 = 0.950    N13 = 1.77250    ν13 = 49.77
r26* = 31.031
  d26 = 0.100
r27 = 15.216
  d27 = 1.090    N14 = 1.51680    ν14 = 64.20
r28 = 16.756
  d28 = 1.000 ~ 9.928 ~ 21.615
  {Fifth Lens Unit Gr5 ... Positive} r29 = 22.882
  d29 = 0.900    N15 = 1.85000    ν15 = 40.04
r30 = 19.232
  d30 = 0.500
r31 = 20.841
  d31 = 2.800    N16 = 1.55232    ν16 = 63.42
r32 = 51.194

[Aspherical Coefficients]

r6: ε = 1.0000
  A4 = 0.35804 × 10⁻⁵
  A6 = −0.26375 × 10⁻⁷
  A8 = 0.70370 × 10⁻⁹
  A10 = −0.92104 × 10⁻¹¹
  A12 = 0.66673 × 10⁻¹³
  A14 = −0.23702 × 10⁻¹⁵
  A16 = 0.32665 × 10⁻¹⁸
r25: ε = 1.0000
  A4 = −0.31615 × 10⁻⁴
  A6 = −0.32752 × 10⁻⁶
  A8 = −0.10688 × 10⁻⁷
  A10 = −0.20845 × 10⁻¹⁰
  A12 = 0.16308 × 10⁻¹¹
  A14 = 0.38056 × 10⁻¹³
  A16 = −0.62701 × 10⁻¹⁵
r26: ε = 1.0000
  A4 = 0.71389 × 10⁻⁴
  A6 = 0.57136 × 10⁻⁷
  A8 = −0.11126 × 10⁻⁷
  A10 = 0.25719 × 10⁻¹⁰
  A12 = 0.23666 × 10⁻¹¹
  A14 = 0.12981 × 10⁻¹³
  A16 = −0.43066 × 10⁻¹⁵

TABLE 5

<< Embodiment 5 >> f = 22.5 ~ 68.2 ~ 215.0
FNO = 4.1 ~ 5.5 ~ 5.8

| Radius of Curvature | Axial Distance | Refractive Index | Abbe Number |
|---|---|---|---|

{First Lens Unit Gr1 ... Positive} r1 = 107.421
  d1 = 1.800    N1 = 1.83400    ν1 = 37.05
r2 = 53.902
  d2 = 6.400    N2 = 1.49310    ν2 = 83.58
r3 = −386.515
  d3 = 0.100

TABLE 5-continued

<< Embodiment 5 >> r4 = 53.023
  d4 = 5.340    N3 = 1.49310    ν3 = 83.58
r5 = 693.135
  d5 = 0.899 ~ 23.977 ~ 49.067
  {Second Lens Unit Gr2 ... Negative} r6* = 85.521
  d6 = 1.000    N4 = 1.61720    ν4 = 54.00
r7 = 15.211
  d7 = 6.630
r8 = −35.778
  d8 = 1.000    N5 = 1.75450    ν5 = 51.57
r9 = 45.101
  d9 = 0.100
r10 = 27.849
  d10 = 3.510    N6 = 1.75000    ν6 = 25.14
r11 = −36.989
  d11 = 1.120
r12 = −21.082
  d12 = 1.000    N7 = 1.75450    ν7 = 51.57
r13 = 374.638
  d13 = 20.515 ~ 9.987 ~ 0.700
  {Aperture Stop S} r14 = ∞
  d14 = 0.500
  {Third Lens Unit Gr3 ... Positive} r15 = 21.738
  d15 = 3.200    N8 = 1.48749    ν8 = 70.44
r16 = −55.138
  d16 = 0.100
r17 = 21.126
  d17 = 3.240    N9 = 1.48749    ν9 = 70.44
r18 = −111.760
  d18 = 1.640
r19 = −31.278
  d19 = 1.000    N10 = 1.80741    ν10 = 31.59
r20 = 59.812
  d20 = 4.850 ~ 1.350 ~ 0.450
  {Fourth Lens Unit Gr4 ... Positive} r21 = 22.840
  d21 = 3.660    N11 = 1.50378    ν11 = 66.89
r22 = −31.960
  d22 = 0.100
r23 = −55.493
  d23 = 2.410    N12 = 1.79850    ν12 = 22.60
r24 = −29.617
  d24 = 0.270
r25* = −86.437
  d25 = 1.000    N13 = 1.77551    ν13 = 37.90
r26* = 29.561
  d26 = 0.100
r27 = 13.303
  d27 = 1.000    N14 = 1.48749    ν14 = 70.44
r28 = 13.105
  d28 = 5.000 ~ 35.588 ~ 49.740
  {(Fifth Lens Unit Gr5 ... Positive} r29 = 25.597
  d29 = 1.510    N15 = 1.75450    ν15 = 51.57
r30 = 28.950

[Aspherical Coefficients]

r6: ε = 1.0000
  A4 = 0.69611 × 10⁻⁵
  A6 = −0.37206 × 10⁻⁷
  A8 = 0.76950 × 10⁻⁹
  A10 = −0.94276 × 10⁻¹¹
  A12 = 0.70697 × 10⁻¹³
  A14 = −0.26153 × 10⁻¹⁵
  A16 = 0.37459 × 10⁻¹⁸
r25: ε = 1.0000
  A4 = −0.71695 × 10⁻⁵
  A6 = −0.15748 × 10⁻⁷

TABLE 5-continued

<< Embodiment 5 >>

$$A8 = -0.84010 \times 10^{-8}$$
$$A10 = -0.10079 \times 10^{-10}$$
$$A12 = 0.83934 \times 10^{-12}$$
$$A14 = 0.21563 \times 10^{-13}$$
$$A16 = -0.27577 \times 10^{-15}$$

r26: $\epsilon = 1.0000$
$$A4 = 0.65921 \times 10^{-4}$$
$$A6 = 0.29931 \times 10^{-6}$$
$$A8 = -0.11278 \times 10^{-7}$$
$$A10 = -0.32202 \times 10^{-10}$$
$$A12 = 0.22495 \times 10^{-11}$$
$$A14 = 0.17170 \times 10^{-13}$$
$$A16 = -0.36261 \times 10^{-15}$$

TABLE 6

<< Embodiment 6 >>

$f = 22.5 \sim 85.0 \sim 312.0$
$FNO = 4.1 \sim 5.5 \sim 5.8$

| Radius of Curvature | Axial Distance | Refractive Index | Abbe Number |
|---|---|---|---|
| {First Lens Unit Gr1 ... Positive} | | | |
| r1 = 100.253 | | | |
|  | d1 = 1.600 | N1 = 1.83400 | ν1 = 37.05 |
| r2 = 53.919 | | | |
|  | d2 = 7.500 | N2 = 1.49310 | ν2 = 83.58 |
| r3 = −1140.485 | | | |
|  | d3 = 0.100 | | |
| r4 = 53.626 | | | |
|  | d4 = 6.200 | N3 = 1.49310 | ν3 = 83.58 |
| r5 = 415.515 | | | |
|  | d5 = 0.899 ~ 33.934 ~ 60.018 | | |
| {Second Lens Unit Gr2 ... Negative} | | | |
| r6 = 89.213 | | | |
|  | d6 = 1.000 | N4 = 1.80420 | ν4 = 46.50 |
| r7 = 16.009 | | | |
|  | d7 = 6.930 | | |
| r8 = −40.001 | | | |
|  | d8 = 1.000 | N5 = 1.75450 | ν5 = 51.57 |
| r9 = 50.505 | | | |
|  | d9 = 0.100 | | |
| r10 = 30.758 | | | |
|  | d10 = 3.440 | N6 = 1.75000 | ν6 = 25.14 |
| r11 = −30.700 | | | |
|  | d11 = 1.100 | | |
| r12 = −20.939 | | | |
|  | d12 = 1.000 | N7 = 1.75450 | ν7 = 51.57 |
| r13 = −1283.532 | | | |
|  | d13 = 27.519 ~ 14.252 ~ 0.700 | | |
| {Aperture Stop S} | | | |
| r14 = ∞ | | | |
|  | d14 = 0.100 | | |
| {Third Lens Unit Gr3 ... Positive} | | | |
| r15 = 19.662 | | | |
|  | d15 = 4.100 | N8 = 1.48749 | ν8 = 70.44 |
| r16 = −55.350 | | | |
|  | d16 = 0.100 | | |
| r17 = 21.253 | | | |
|  | d17 = 3.527 | N9 = 1.48749 | ν9 = 70.44 |
| r18 = 369.133 | | | |
|  | d18 = 1.546 | | |
| r19 = −31.623 | | | |
|  | d19 = 1.000 | N10 = 1.80741 | ν10 = 31.59 |
| r20 = 45.095 | | | |
|  | d20 = 4.398 ~ 1.437 ~ 0.198 | | |

TABLE 6-continued

<< Embodiment 6 >>

| Radius of Curvature | Axial Distance | Refractive Index | Abbe Number |
|---|---|---|---|
| {Fourth Lens Unit Gr4 ... Positive} | | | |
| r21 = 21.838 | | | |
|  | d21 = 3.930 | N11 = 1.51823 | ν11 = 58.96 |
| r22 = −37.980 | | | |
|  | d22 = 0.100 | | |
| r23 = −908.612 | | | |
|  | d23 = 2.040 | N12 = 1.75000 | ν12 = 25.14 |
| r24 = −40.900 | | | |
|  | d24 = 1.500 | | |
| r25* = −56.331 | | | |
|  | d25 = 1.000 | N13 = 1.83400 | ν13 = 37.05 |
| r26* = 27.611 | | | |
|  | d26 = 0.100 | | |
| r27 = 15.015 | | | |
|  | d27 = 1.000 | N14 = 1.48749 | ν14 = 70.44 |
| r28 = 15.081 | | | |
|  | d28 = 5.000 ~ 17.988 ~ 16.292 | | |
| {Fifth Lens Unit Gr5 ... Positive} | | | |
| r29 = 26.651 | | | |
|  | d29 = 1.645 | N15 = 1.71300 | ν15 = 53.93 |
| r30 = 32.166 | | | |

[Aspherical Coefficients]

r6: $\epsilon = 1.0000$
$$A4 = 0.52706 \times 10^{-5}$$
$$A6 = -0.22246 \times 10^{-7}$$
$$A8 = 0.71694 \times 10^{-9}$$
$$A10 = -0.92114 \times 10^{-11}$$
$$A12 = 0.66032 \times 10^{-13}$$
$$A14 = -0.24657 \times 10^{-15}$$
$$A16 = 0.37584 \times 10^{-18}$$

r25: $\epsilon = 1.0000$
$$A4 = -0.56236 \times 10^{-5}$$
$$A6 = 0.84829 \times 10^{-8}$$
$$A8 = -0.87959 \times 10^{-8}$$
$$A10 = -0.88183 \times 10^{-11}$$
$$A12 = 0.79028 \times 10^{-12}$$
$$A14 = 0.21851 \times 10^{-13}$$
$$A16 = -0.27542 \times 10^{-15}$$

r26: $\epsilon = 1.0000$
$$A4 = 0.69231 \times 10^{-4}$$
$$A6 = 0.29030 \times 10^{-6}$$
$$A8 = -0.10139 \times 10^{-7}$$
$$A10 = -0.41417 \times 10^{-10}$$
$$A12 = 0.21030 \times 10^{-11}$$
$$A14 = 0.16310 \times 10^{-13}$$
$$A16 = -0.33318 \times 10^{-15}$$

TABLE 7

<< Embodiment 7 >>

$f = 22.5 \sim 85.0 \sim 312.0$
$FNO = 4.1 \sim 5.5 \sim 5.8$

| Radius of Curvature | Axial Distance | Refractive Index | Abbe Number |
|---|---|---|---|
| {First Lens Unit Gr1 ... Positive} | | | |
| r1 = 100.707 | | | |
|  | d1 = 1.600 | N1 = 1.83400 | ν1 = 37.05 |
| r2 = 53.500 | | | |
|  | d2 = 7.800 | N2 = 1.49310 | ν2 = 83.58 |
| r3 = −1206.520 | | | |
|  | d3 = 0.100 | | |
| r4 = 52.540 | | | |
|  | d4 = 6.500 | N3 = 1.49310 | ν3 = 83.58 |
| r5 = 387.306 | | | |
|  | d5 = 0.899 ~ 33.111 ~ 59.391 | | |

TABLE 7-continued

<< Embodiment 7 >>

{Second Lens Unit Gr2 ... Negative} r6* = 73.079

| | | |
|---|---|---|
| d6 = 1.000 | N4 = 1.80420 | ν4 = 46.50 | r7 = 15.683 d7 = 6.930 r8 = −40.462

| | | |
|---|---|---|
| d8 = 1.000 | N5 = 1.75450 | ν5 = 51.57 | r9 = 69.678 d9 = 0.100 r10 = 28.716

| | | |
|---|---|---|
| d10 = 3.440 | N6 = 1.75000 | ν6 = 25.14 | r11 = −35.706 d11 = 1.100 r12 = −24.416

| | | |
|---|---|---|
| d12 = 1.000 | N7 = 1.75450 | ν7 = 51.57 | r13 = 94.533 d13 = 26.777 ~ 13.862 ~ 0.700
{Aperture Stop S} r14 = ∞ d14 = 0.100
{Third Lens Unit Gr3 ... Positive} r15* = 19.493

| | | |
|---|---|---|
| d15 = 4.100 | N8 = 1.48749 | ν8 = 70.44 | r16 = −74.560 d16 = 0.100 r17 = 19.077

| | | |
|---|---|---|
| d17 = 3.527 | N9 = 1.48749 | ν9 = 70.44 | r18 = 2044.363 d18 = 1.546 r19 = −36.938

| | | |
|---|---|---|
| d19 = 1.000 | N10 = 1.80741 | ν10 = 31.59 | r20 = 33.157 d20 = 4.398 ~ 1.437 ~ 0.198
{Fourth Lens Unit Gr4 ... Positive} r21 = 21.455

| | | |
|---|---|---|
| d21 = 3.930 | N11 = 1.51680 | ν11 = 64.20 | r22 = −46.318 d22 = 0.100 r23 = 179.187

| | | |
|---|---|---|
| d23 = 2.040 | N12 = 1.75000 | ν12 = 25.14 | r24 = −38.788 d24 = 1.500 r25* = −51.159

| | | |
|---|---|---|
| d25 = 1.000 | N13 = 1.83400 | ν13 = 37.05 | r26* = 26.150 d26 = 0.100 r27 = 14.706

| | | |
|---|---|---|
| d27 = 1.000 | N14 = 1.48749 | ν14 = 70.44 | r28 = 15.197 d28 = 5.000 ~ 17.636 ~ 15.551
{Fifth Lens Unit Gr5 ... Positive} r29* = 20.904

| | | |
|---|---|---|
| d29 = 1.645 | N15 = 1.71300 | ν15 = 53.93 | r30 = 23.686

[Aspherical Coefficients]

r6: ε = 1.0000
A4 = 0.22917 × $10^{-5}$
A6 = −0.22836 × $10^{-7}$
A8 = 0.75510 × $10^{-9}$
A10 = −0.96274 × $10^{-11}$
A12 = 0.67169 × $10^{-13}$
A14 = −0.24702 × $10^{-15}$
A16 = 0.37318 × $10^{-18}$ r15: ε = 1.0000
A4 = −0.24149 × $01^{-5}$
A6 = −0.17275 × $10^{-7}$
A8 = 0.15289 × $10^{-9}$
A10 = 0.14656 × $10^{-11}$
A12 = −0.14069 × $10^{-13}$

TABLE 7-continued

<< Embodiment 7 >> r25: ε = 1.0000
A4 = −0.72345 × $10^{-5}$
A6 = −0.64833 × $10^{-8}$
A8 = −0.87712 × $10^{-8}$
A10 = −0.81898 × $10^{-11}$
A12 = 0.79533 × $10^{-12}$
A14 = 0.21851 × $10^{-13}$
A16 = −0.27542 × $10^{-15}$ r26: ε = 1.0000
A4 = 0.70463 × $10^{-4}$
A6 = 0.30519 × $10^{-6}$
A8 = −0.10149 × $10^{-7}$
A10 = −0.41997 × $10^{-10}$
A12 = 0.20979 × $10^{-11}$
A14 = 0.16310 × $10^{-13}$
A16 = −0.33318 × $10^{-15}$ r29: ε = 1.0000
A4 = −0.48841 × $10^{-6}$
A6 = −0.37160 × $10^{-8}$
A8 = −0.10500 × $10^{-9}$
A10 = 0.35226 × $10^{-12}$

TABLE 8

| | Cond. (1) ‖f2/fT‖ | Cond. (2) (fT/f34W)×Z | Cond. (3) ‖f12W/fT‖ | Cond. (4) D3/D4 |
|---|---|---|---|---|
| Emb. 1 | 0.07 | 81.7 | 0.09 | 0.87 |
| Emb. 2 | 0.07 | 81.7 | 0.09 | 0.90 |
| Emb. 3 | 0.07 | 82.7 | 0.09 | 0.88 |
| Emb. 4 | 0.07 | 74.66 | 0.10 | 0.93 |
| Emb. 5 | 0.07 | 82.18 | 0.09 | 0.90 |
| Emb. 6 | 0.05 | 157.5 | 0.06 | 0.90 |
| Emb. 7 | 0.05 | 161.5 | 0.06 | 0.90 |

What is claimed is:

1. A zoom lens system comprising, from the object side:
a first lens unit having a positive optical power;
a second lens unit having a negative optical power;
a third lens unit having a positive optical power;
a fourth lens unit having a positive optical power; and
a fifth lens unit having a positive optical power,
wherein said first, third and fourth lens units are moveable along an optical axis so that distances between the lens units vary during zooming,
wherein the zoom lens system fulfills the following conditions:

$$0.01 \leq |f2/fT| \leq 0.20$$

$$25 \leq (fT/f34W) \times Z \leq 300$$

where
f2 represents a focal length of the second lens unit;
fT represents a focal length of the entire zoom lens system at a longest focal length condition;
f34W represents a composite focal length of the third and fourth lens units at a shortest focal length condition; and
Z represents a zoom ratio.

2. A zoom lens system in accordance with claim 1, wherein said fifth lens unit has a meniscus lens element having a convex surface on the object side.

3. A zoom lens system in accordance with claim 1, wherein said zoom lens system fulfills the following condition:

$$0.30 \leq D3/D4 \leq 0.98$$

where
D3 represents a moving amount of the third lens unit during zooming from a shortest focal length condition to a longest focal length condition; and
D4 represents a moving amount of the fourth lens unit during zooming from a shortest focal length condition to a longest focal length condition.

4. A zoom lens system in accordance with claim 1, wherein said second lens unit has an aspherical surface.

5. A zoom lens system in accordance with claim 1, wherein said third lens unit has an aspherical surface.

6. A zoom lens system in accordance with claim 1, wherein said fourth lens unit has an aspherical surface.

7. A zoom lens system in accordance with claim 1, wherein said fifth lens unit has an aspherical surface.

8. A zoom lens system in accordance with claim 1, wherein in zooming from a shortest focal length condition to a longest focal length condition said fifth lens unit moves along the optical axis to describe a locus convex toward the object side.

9. A zoom lens system consisting of, from the object side:
a first lens unit having a positive optical power;
a second lens unit having a negative optical power;
a third lens unit having a positive optical power;
a fourth lens unit having a positive optical power; and
a fifth lens unit having a positive optical power,
wherein said first, third and fourth lens units move along the optical axis so that distances between the lens units vary during zooming,
wherein the zoom lens system fulfills the following condition:

$$25 \leq (fT/f34W) \times Z \leq 300$$

where
fT represents a focal length of the entire zoom lens system at a longest focal length condition;
f34W represents a composite focal length of the third and fourth lens units at a shortest focal length condition; and
Z represents a zoom ratio.

10. A zoom lens system in accordance with claim 9, wherein said fifth lens unit has a meniscus lens element having a convex surface on the object side.

11. A zoom lens system in accordance with claim 9, wherein said zoom lens system fulfills the following condition:

$$0.30 \leq D3/D4 \leq 0.98$$

where
D3 represents a moving amount of the third lens unit during zooming from a shortest focal length condition to a longest focal length condition; and
D4 represents a moving amount of the fourth lens unit during zooming from a shortest focal length condition to a longest focal length condition.

12. A zoom lens system comprising, from the object side:
a first lens unit having a positive optical power;
a second lens unit having a negative optical power;
a third lens unit having a positive optical power;
a fourth lens unit having a positive optical power; and
a fifth lens unit having a positive optical power,
wherein said first, third and fourth lens units are moveable along an optical axis so that distances between the lens units vary during zooming,
wherein the zoom lens system fulfills the following conditions:

$$0.01 \leq |f2/fT| \leq 0.20$$

$$25 \leq (fT/f34W) \times Z \leq 300$$

$$0.01 < |f12W/fT| < 0.15$$

where
f2 represents a focal length of the second lens unit;
fT represents a focal length of the entire zoom lens system at a longest focal length-condition;
f34W represents a composite focal length of the third and fourth lens units at a shortest focal length condition;
Z represents a zoom ratio; and
f12W represents a composite focal length of the first and second lens units at a shortest focal length condition.

13. A zoom lens system in accordance with claim 12, wherein said zoom lens system fulfils the following condition:

$$0.30 \leq D3/D4 \leq 0.98$$

where
D3 represents a moving amount of the third lens unit during zooming from a shortest focal length condition to a longest focal length condition; and
D4 represents a moving amount of the fourth lens unit during zooming from a shortest focal length condition to a longest focal length condition.

14. A zoom lens system consisting of, from the object side:
a first lens unit having a positive optical power;
a second lens unit having a negative optical power;
a third lens unit having a positive optical power;
a fourth lens unit having a positive optical power; and
a fifth lens unit having a positive optical power,
wherein said first, third and fourth lens units are moveable along an optical axis so that distances between the lens units vary during zooming,
wherein the zoom lens system fulfills the following conditions:

$$0.01 \leq |f2/fT| \leq 0.20$$

$$0.01 < |f12W/fT| < 0.15$$

where
f2 represents a focal length of the second lens unit;
fT represents a focal length of the entire zoom lens system at a longest focal length condition; and
f12W represents a composite focal length of the first and second lens units at a shortest focal length condition.

15. A zoom lens system consisting of, from the object side:
a first lens unit having a positive optical power;
a second lens unit having a negative optical power;
a third lens unit having a positive optical power;
a fourth lens unit having a positive optical power; and
a fifth lens unit having a positive optical power,
wherein said first, third and fourth lens units are moveable along an optical axis so that distances between the lens units vary during zooming, wherein the zoom lens system fulfills the following conditions:

$$0.01 < |f12W/fT| < 0.15$$

$$25 \leq (fT/f34W) \times Z \leq 300$$

where
fT represents a focal length of the entire zoom lens system at a longest focal length condition;
f34W represents a composite focal length of the third and fourth lens units at a shortest focal length condition;
Z represents a zoom ratio; and
f12W represents a composite focal length of the first and second lens units at a shortest focal length condition.

16. A zoom lens system comprising, from the object side:
a first lens unit having a positive optical power;
a second lens unit having a negative optical power;
a third lens unit having a positive optical power;
a fourth lens unit having a positive optical power;
a fifth lens unit having a positive optical power;
wherein for zooming from a shortest focal length condition to a longest focal length condition said first, third and fourth lens units are moveable along an optical axis toward the object side and said second lens unit is moveable along the optical axis to describe a locus convex toward the object side, and
wherein the lens system fulfills the following condition:

$$0.01 < |f12W/fT| < 0.15$$

where
f12W represents a composite focal length of the first and second lens units at a shortest focal length condition; and
fT represents a focal length of the entire zoom lens unit.

* * * * *